United States Patent
Okubo

(10) Patent No.: US 8,460,101 B2
(45) Date of Patent: Jun. 11, 2013

(54) GAME PROGRAM, GAME DEVICE, AND GAME METHOD

(75) Inventor: Satoru Okubo, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 885 days.

(21) Appl. No.: 11/956,817

(22) Filed: Dec. 14, 2007

(65) Prior Publication Data

US 2008/0125222 A1     May 29, 2008

Related U.S. Application Data

(63) Continuation of application No. PCT/JP2006/312572, filed on Jun. 23, 2006.

(30) Foreign Application Priority Data

Jul. 11, 2005    (JP) .................................. 2005-202176

(51) Int. Cl.
    *A63F 13/00*       (2006.01)
(52) U.S. Cl.
    USPC .............................................. 463/35; 463/31
(58) Field of Classification Search
    USPC ...................................................... 463/35, 42
    See application file for complete search history.

(56) References Cited

U.S. PATENT DOCUMENTS

| | | | | |
|---|---|---|---|---|
| 5,390,938 A | * | 2/1995 | Takeya | 463/35 |
| 5,393,073 A | * | 2/1995 | Best | 463/35 |
| 5,993,314 A | * | 11/1999 | Dannenberg et al. | 463/1 |
| 5,993,318 A | * | 11/1999 | Kousaki | 463/35 |
| 2003/0013533 A1 | * | 1/2003 | Uenishi et al. | 463/43 |
| 2007/0099703 A1 | * | 5/2007 | Terebilo | 463/42 |

FOREIGN PATENT DOCUMENTS

| | | |
|---|---|---|
| JP | H11-468 A | 1/1999 |
| JP | 2001-252467 A | 9/2001 |
| JP | 3306039 B2 | 5/2002 |
| JP | 2002-325964 A | 11/2002 |
| JP | 3425548 B2 | 5/2003 |
| JP | 3448044 B2 | 7/2003 |
| JP | 2004-213320 A | 7/2004 |
| TW | 1222378 B | 10/2004 |
| TW | 1222890 B | 11/2004 |
| TW | 1233831 B | 6/2005 |

* cited by examiner

*Primary Examiner* — Paul A. D'Agostino
*Assistant Examiner* — Ankit Doshi
(74) *Attorney, Agent, or Firm* — Global IP Counselors, LLP

(57) ABSTRACT

A game program is provided which provides a video game with reality and improves a sense of realism of in the video game in a game program. In Step S21, it is determined whether a given game condition is satisfied. In Step S22, in the case where a stadium type is determined as a dome stadium and the stadium arrangement is determined that the right stand is the home team side, the song playing location is determined as the "Right-Field Side". In Step S23, a song playing volume is determined. In Step S24, a song playing tempo is determined. In Steps S25 and S26, a basic song and a basic voice are respectively read. In Steps S27 and S28, the data of the basic song and the basic voice are respectively altered to achieve the song playing location on "Right-Field Side", the song playing volume, the song playing tempo that are determined in Steps S22, S23, and S24.

10 Claims, 17 Drawing Sheets

GAME PROGRAM, GAME DEVICE, AND GAME METHOD

CROSS-REFERENCE TO THE RELATED APPLICATIONS

This application is a continuation application of International Application No. PCT/JP2006/312572 filed on Jun. 23, 2006. The entire disclosure of International Patent Application No. PCT/JP2006/312572 is hereby incorporated herein by reference.

This application claims priority to Japan Patent Application No. 2005-202176. The entire disclosure of Japan Patent Application No. 2005-202176 is hereby incorporated herein by reference.

BACKGROUND OF INVENTION

1. Technical Field

The present invention relates to a game program, and in particular to a game program that causes a computer to realize a game that operates a video game character. In addition, the present invention relates to a game device and a game method that are realized by this game program.

2. Background Art

Various types of games are conventionally proposed. A cooperative video game such as a baseball video game is known as one type of the video games which operates athlete characters who are displayed on a monitor so that they play a competition game. In this type of baseball video game, one player selects one baseball team to which athlete characters belong, and can play the baseball video game with another player or a computer that selects another baseball team.

In this type of baseball video game, for example, a baseball video game is known which, when a base ball team that is selected by a video game player is batting, plays the fight song that is prepared for the baseball team that is selected by the video game player. Japanese Laid-Open Patent Publication No. 11-468 discloses such video game as an example.

Also, when a baseball team that is selected by a cooperative video game player is batting, the video game plays a fight song that is prepared for the baseball team that is selected by the cooperative video game player. These types of fight songs are fight songs that are prepared specifically for baseball teams, and are songs different from each other team. Also, when a baseball team is batting, the video game can play not only the fight song that is prepared specifically for the baseball team but also a fight song that is prepared specifically for an athlete character who is at bat. The video game plays these types of fight songs at a predetermined constant volume as if sound is reverberated in the whole stadium.

When a baseball team that is selected by a cooperative video game player is batting, the video game automatically plays fight songs that are previously stored as melody in a memory, or are created by a video game player and are saved in a memory.

SUMMARY OF INVENTION

The aforementioned baseball video game that can play the fight songs plays the fight songs in accordance with baseball teams or athlete characters as if sound is reverberated in the whole stadium.

However, in actual baseball games, for example, in the case where many home team supporters occupy the right stand in a stadium, the fight song is played at a high volume on the right stand side in the stadium. Contrary to this, the conventional baseball video game plays the fight songs at a predetermined constant volume. Accordingly, the home team fight song is also played on the left stand side in the stadium. As a result, it is difficult to provide a baseball video game with reality close to actual baseball games. For this reason, a sense of realism may be reduced in the video game.

The object of the present invention is to provide a video game with reality and to improve a sense of realism of in the video game in a game program.

A game program according to a first aspect of the present invention causes a computer capable of realizing a game that operates a video game character to realize the following functions.

A game condition determination function that determines whether a given game condition is satisfied.

(2) A song playing location determination function that, if the video game condition determination function determines that the given game condition is satisfied, determines a song playing location where a given song related to the video game character is played.

(3) A song playing function that produces game sound as if the given song related to the video game character is played at the song playing location that is determined by the song playing location determination function.

In the game that is realized by this program, the game condition determination function determines whether the given game condition is satisfied. If the video game condition determination function determines that the given game condition is satisfied, the song playing location determination function determines a song playing location where a given song related to the video game character is played. The song playing function produces game sound as if the given song related to the video game character is played at the song playing location that is determined by the song playing location determination function.

For example, it is considered the case where, in a baseball video game that operates athlete characters, the fight songs related to the athlete characters are played. In this case, the game condition determination function determines whether a given game condition is satisfied. Examples of the given game conditions are provided by an athlete name, a team name, a stadium name, a home/away team, a dome/open-air stadium, batting/fielding, scoring opportunity/non scoring opportunity, and the like. If the game condition determination function determines that the given game condition is satisfied, for example, if the team that is selected by a player is a home team the supporters of which occupy the right stand side in large numbers, and the team is batting, the song playing location determination function determines that the fight song is played on the right stand side. The song playing function plays the fight song on the right stand side at a volume higher than the volume on the left stand side to produce the game sound as if the fight song is played on the right stand side.

In this game program, the song playing function produces game sound as if the given song related to the video game character is played at the song playing location that is determined by the song playing location determination function. In this configuration, since, in the case where the team that is selected by a player is a home team the supporters of which occupy the right stand side in large numbers, and the team is batting, for example, the game sound is produced as if the fight song is played on the right stand side, it is possible to provide a baseball video game with reality close to actual baseball games and to improve a sense of realism in the video game.

A game program according to a second aspect of the present invention, in the game program according to the first aspect of the present invention, the song playing function can produce the game sound as if the given song related to the video game character is played at a first song playing location or a second song playing location that is spaced away from the first song playing location. The song playing function plays the given song related to the video game character at the first song playing location at a volume higher than the volume at the second song playing location, if the song playing location determination function determines that the song playing location is the first song playing location.

In this configuration, in the case where the team that is selected by a player is a home team the supporters of which occupy the right stand side in large numbers, and the team is batting, for example, the fight song is played on the right stand side as the first song playing location at a volume higher than the volume on the left stand side as the second song playing location. Accordingly, it is easily produce game sound as if the fight song is played on the right stand side as the first song playing location.

A game program according to a third aspect of the present invention, in the game program according to the first or second aspect of the present invention, the song playing function can produce the game sound as if the given song related to the video game character is played at a first song playing location or a second song playing location that is spaced away from the first song playing location. The song playing function plays the given song related to the video game character at the second song playing location at timing delayed from the song play start time of the first song playing location, if the song playing location determination function determines that the song playing location is the first song playing location.

In this configuration, in the case where the team that is selected by a player is a home team the supporters of which occupy the right stand side in large numbers, and the team is batting, for example, the fight song that is played on the left stand side as the second song playing location at song play starting time that is delayed from the song play start time of the fight song on the right stand side as the first song playing location. Accordingly, echo sound (reflected sound) of the fight song on the right stand side as the first song playing location can be played as the fight song on the left stand side as the second song playing location. Therefore, it is possible to provide a baseball video game with reality closer to actual baseball games.

A game program according to a fourth aspect of the present invention, in the game program according to any of the first to third aspects of the present invention, the song playing function can produce the game sound as if the given song related to the video game character is played at a first song playing location or a second song playing location that is spaced away from the first song playing location. The song playing function plays the given song related to the video game character at the first song playing location so that the song fades out when getting close to the song play stop time, if the song playing location determination function determines that the song playing location is the first song playing location.

In this configuration, in the case where the team that is selected by a player is a home team the supporters of which occupy the right stand side in large numbers, and the team is batting, for example, the fight song is played on the right stand side as the determined location so that the fight song fades out when getting close to the song play stop time. Accordingly, the song at the determined location can fade out when getting close to the song play stop time. Therefore, it is possible to provide a baseball video game with reality further closer to actual baseball games.

A game program according to a fifth aspect of the present invention, in the game program according to any of the first to fourth aspects of the present invention, the game program further causes the computer to realize a song creating function that creates the given song related to the video game character. The song playing function starts playing the given song related to the video game character at timing delayed from the song play start time of the given song related to the video game character that is created by the song creating function.

In the song creating function in the game program, musical note characters that represent predetermined musical notes are horizontally arranged in a field at vertical positions corresponding to intervals of a piano keyboard in a song creating screen to define intervals, the lengths of musical notes, and a melody. In this configuration, the musical note characters that are arranged by a player are automatically and horizontally shifted, as non-displayed musical note characters, in the direction where playing start timing is delayed. Accordingly, echo sound (reflected sound) can be played without specific operation or setting by the player. Therefore, it is possible to easily provide a baseball video game with reality close to actual baseball games.

A game device according to a sixth aspect of the present invention realizes a game that operates a video game character. The game device includes a game condition determination section, a song playing location determination section, and a song playing section. The game condition determination section determines whether a given game condition is satisfied. If the video game condition determination section determines that the given game condition is satisfied, the song playing location determination section determines a song playing location where a given song related to the video game character is played. The song playing section produces game sound as if the given song related to the video game character is played at the song playing location that is determined by the song playing location determination section.

A game method according to a seventh aspect of the present invention causes a computer to realize a game that operates a video game character. The game method includes a game condition determination step, a song playing location determination step, and a song playing step. The game condition determination step determines whether a given game condition is satisfied. If the video game condition determination step determines that the given game condition is satisfied, the song playing location determination step determines a song playing location where a given song related to the video game character is played. The song playing step produces game sound as if the given song related to the video game character is played at the song playing location that is determined in the song playing location determination step.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Configuration and Operation of Video Game Device

Figure 1:
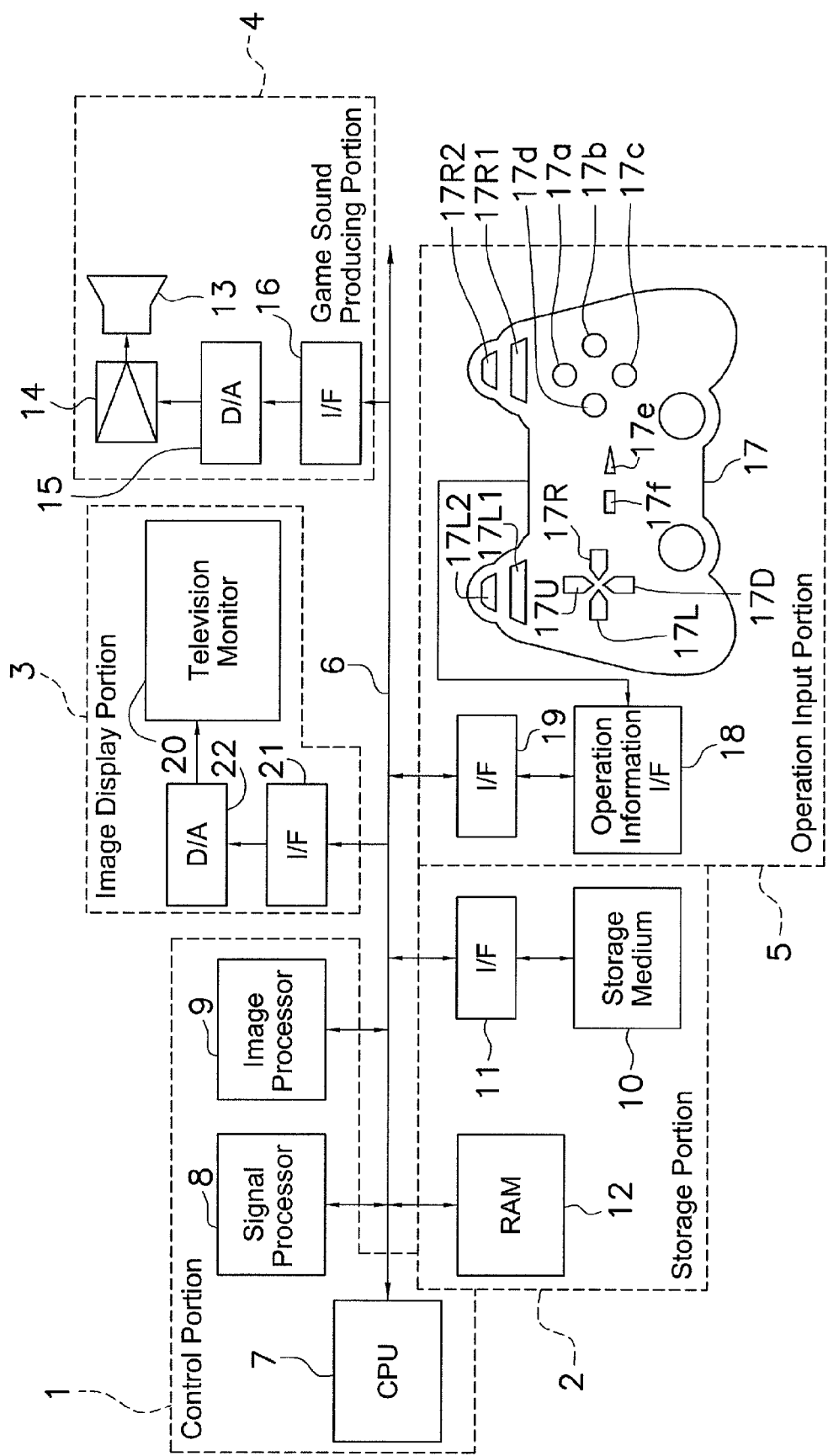
FIG. 1 is a general block diagram showing a video game device according to one embodiment of the present invention.

FIG. 1 is a general block diagram showing a video game device according to one embodiment of the present invention. In this embodiment, a home video game device is described as one example of the game device. The home video game device includes the home video game unit and a home television set. A storage medium 10 can be mounted to the home video game unit. The home video game unit suitably reads video game data from the storage medium 10, and executes a video game. The contents of the thus-executed video game are displayed on the home television set.

The game system of the home video game device includes a control portion 1, a storage portion 2, an image display portion 3, a game sound producing portion 4, and an operation input portion 5. They are connected to each other via a bus 6. The bus 6 includes an address bus, a data bus, a control bus, and the like. In this embodiment, the home video game unit of the home video game device includes the control portion 1, the storage portion 2, the game sound producing portion 4, and the operation input portion 5. The home television set includes the image display portion 3.

The control portion 1 mainly controls processing of the video game as a whole based on a video game program. The control portion 1 includes a CPU 7 (Central Processing Unit), a signal processor 8, and an image processor 9, for example. The CPU 7, the signal processor 8, and the image processor 9 are connected to each other via the bus 6. The CPU 7 interprets commands in the video game program, and realizes various types of data processing and control. For example, the CPU 7 instructs the signal processor 8 to provide image data to the image processor. The signal processor 8 mainly executes calculation in three-dimensional space, position conversion calculation from three-dimensional space to the pseudo three-dimensional space, light source calculation processing, and image-and-sound generation/conversion processing. The image processor 9 mainly executes write processing of image data to be displayed into a RAM 12 based on the calculation and processing results by the signal processor 8.

The storage portion 2 is provided mainly to store program data, various types of data to be used in the program data, and the like. The storage portion 2 includes a storage medium 10, an interface circuit 11, and the RAM 12 (Random Access Memory), for example. The interface circuit 11 is connected to the storage medium 10. Also, the interface circuit 11 and the RAM 12 are connected to each other via the bus 6. The storage medium 10 stores the program data of the operation system, the video game data composed of image data, sound data and various types of program data, and the like. For example, the storage medium 10 can be a ROM (Read Only Memory) cassette, an optical disc, a flexible disk or the like, and stores the program data of an operating system, the game data and the like. Note that a card type memory can be also included as the storage medium 10. This type of card type memory is used mainly to save various game parameters at leaving-off time when the video game leaves off. The RAM 12 is used to temporarily store various types of data that are read from the storage medium 10 and to temporarily store the processing by the control portion 1. The RAM 12 stores various types of data together with address data that indicates memory locations of the various types of data. When a certain address is given to the RAM 12, data can be read from or written to the RAM 12.

The image display portion 3 mainly provides image data that is written in the RAM 12 by the image processor 9, image data that is read from the storage medium 10 and the like as images. The image display portion 3 includes a television monitor 20, an interface circuit 21, and a D/A converter 22 (Digital-To-Analog converter), for example. The D/A converter 22 is connected to the television monitor 20. The interface circuit 21 is connected to the D/A converter 22. Also, the bus 6 is connected to the interface circuit 21. In this embodiment, the image data is provided to the D/A converter 22 via the interface circuit 21, and is converted into analog image signals. The analog image signal is then provided to the television monitor 20 as an image.

In this embodiment, for example, the image data includes polygonal data, texture data, and the like. The polygonal data is the coordinate data of vertices that define polygonal shapes. The texture data specifies texture patterns of the polygonal shapes, and includes texture setting data and texture color data. The texture setting data gives correspondence between the polygonal shapes and the texture patters. The texture color data specifies the colors of the texture patterns. In this embodiment, the polygonal data and the texture data are associated with polygon address data and texture address data, respectively. The polygon address data and texture address data indicate memory locations of the polygonal data and the texture data, respectively. In this type of image data, the signal processor 8 executes coordinate transformation and perspective projection conversion of the polygonal data in three-dimensional space (three-dimensional polygonal data) that is indicated by the polygon address data based on the movement amount data and the rotation amount data of the screen (viewpoint). Thus, the polygonal data in three-dimensional space is converted into polygonal data in two-dimensional space (two-dimensional polygonal data). Thus, two-dimensional polygonal data gives the outlines of a plurality of polygonal shapes, and texture patterns of the texture data that are indicated by the texture address data fill the interiors of the polygonal shapes. As a result, it is possible to create objects that are composed of the polygonal shapes that are filled the texture patterns, that is, various types of characters.

The game sound producing portion 4 is included mainly to provide the sound data that is read from the storage medium 10 as game sound. The game sound producing portion 4 includes a speaker 13, an amplification circuit 14, a D/A converter 15, and an interface circuit 16, for example. The amplification circuit 14 is connected to the speaker 13. The D/A converter 15 is connected to the amplification circuit 14. The interface circuit 16 is connected to the D/A converter 15. Also, the bus 6 is connected to the interface circuit 16. In this embodiment, the sound data is provided to the D/A converter 15 via the interface circuit 16, and is converted into analog sound signals. The amplification circuit 14 amplifies the analog sound signals. Game sound is produced based on the amplified analog sound signals by the speaker 13. Examples of the sound data are provided by ADPCM (Adaptive Differential Pulse Code Modulation) data, PCM (Pulse Code Modulation) data, and the like, for example. In the case of ADPCM data, game sound can be produced by the speaker 13 similarly to the aforementioned manner. In the case of PCM data, the PCM data is converted into ADPCM data in the RAM 12, and thus game sound can be produced by the speaker 13 similarly to the aforementioned manner.

The operation input portion 5 mainly includes a controller 17, an operation information interface circuit 18, and an interface circuit 19. The operation information interface circuit 18 is connected to the controller 17. The interface circuit 19 is connected to the operation information interface circuit 18. Also, the bus 6 is connected to the interface circuit 19.

A player uses the controller 17 as an operating device to input various types of operating instructions. The controller 17 provides operation signals to the CPU 7 in accordance with the operation by the player. The controller 17 includes first to fourth buttons 17a-17d, an up key 17U, a down key 17D, a left key 17L, a right key 17R, an L1 button 17L1, an L2 button 17L2, an R1 button 17R1, an R2 button 17R2, a start button 17e, a select button 17f, a left stick 17SL, and a right stick 17SR.

The up key 17U, the down key 17D, the left key 17L, and the right key 17R are used to provide the CPU 7 with commands that move a character or a cursor upward, downward, leftward and rightward on the screen of the television monitor 20, respectively, for example.

The player uses the start button 17e if providing the CPU 7 with an instruction that loads a game program from the storage medium 10. Also, in the case where a title screen is displayed on the television monitor 20, if the player presses the start button 17e, a mode select screen will be displayed on the television monitor 20 so that the user can select various types of modes.

The player uses the select button 17f if providing the CPU 7 with an instruction for various types of selection related to the game program that is loaded from the storage medium 10.

The left stick 17SL and right stick 17SR are stick type controllers that are configured substantially similarly to a so-called joystick. The stick-type controller has an upright stick. The stick is configured tiltably from the upright position in all 360° directions (including frontward, backward, leftward and rightward) about the support of the stick. Each of the left stick 17SL and the right stick 17SR provides the CPU 7 via the operation information interface circuit 18 and the interface circuit 19 with an operation signal of x-y coordinates with respect to the upright position as an origin point in accordance with the tilting direction and the tilting amount of the stick.

The various types of functions are associated with the first to fourth buttons 17a-17d, the L1 button 17L1, the L2 button 17L2, the R1 button 17R1, and the R2 button 17R2 in accordance with a game program that is loaded from the storage medium 10. For example, the second and third buttons 17b and 17c are used if the player provides the CPU 7 with instructions that select a menu item and display a next screen image. The first and fourth buttons 17a and 17d are used if the player provides the CPU 7 with instructions that cancel a selected menu item and return to a previous screen image.

Furthermore, the buttons and the keys on the controller 17 other than the left and right sticks 17SL and 17SR are ON/OFF switches that are turned ON when pressed down from their rest positions by an external pressing force, and are turned OFF when the pressing force is stopped and the ON/OFF switches return to the rest positions.

The general operation of the thus-configured home video game device is now described. When a power switch (not shown) is turned ON to provide power to a game system 1, the CPU 7 reads the image data, the sound data and the program data from the storage medium 10 based on the operating system that is stored in the storage medium 10. The read image data, sound data and program data are partially or entirely stored in the RAM 12. Also, the CPU 7 issues commands to the image data and sound data that are stored in the RAM 12 based on the program data that is stored in the RAM 12.

As for the image data, the signal processor 8 first executes position calculation, light source calculation and the like of a character in three-dimensional space based on the commands from the CPU 7. The image processor 9 then executes write processing and the like of image data to be displayed into the RAM 12 based on the calculation result by the signal processor 8. The image data that is written into the RAM 12 is then provided to the D/A converter 22 via the interface circuit 21. The image data is then converted into analog image signals by the D/A converter 22. Thus, the image data is provided to, and is displayed on the television monitor 20.

As for the sound data, the signal processor 8 first executes sound data generation and conversion processing based on the commands from the CPU 7. In this case, the sound data is subjected to processing such as pitch conversion, noise addition, envelope setting, level setting and reverb addition, for example. The sound data is then provided from the signal processor 8 to the D/A converter 15 via the interface circuit 16. The sound data is converted into analog signals in the D/A converter 15. Thus, the sound data is produced as game sound by the speaker 13 via the amplification circuit 14.

Outlines of Various Types of Processing in Game Device

Figure 2:
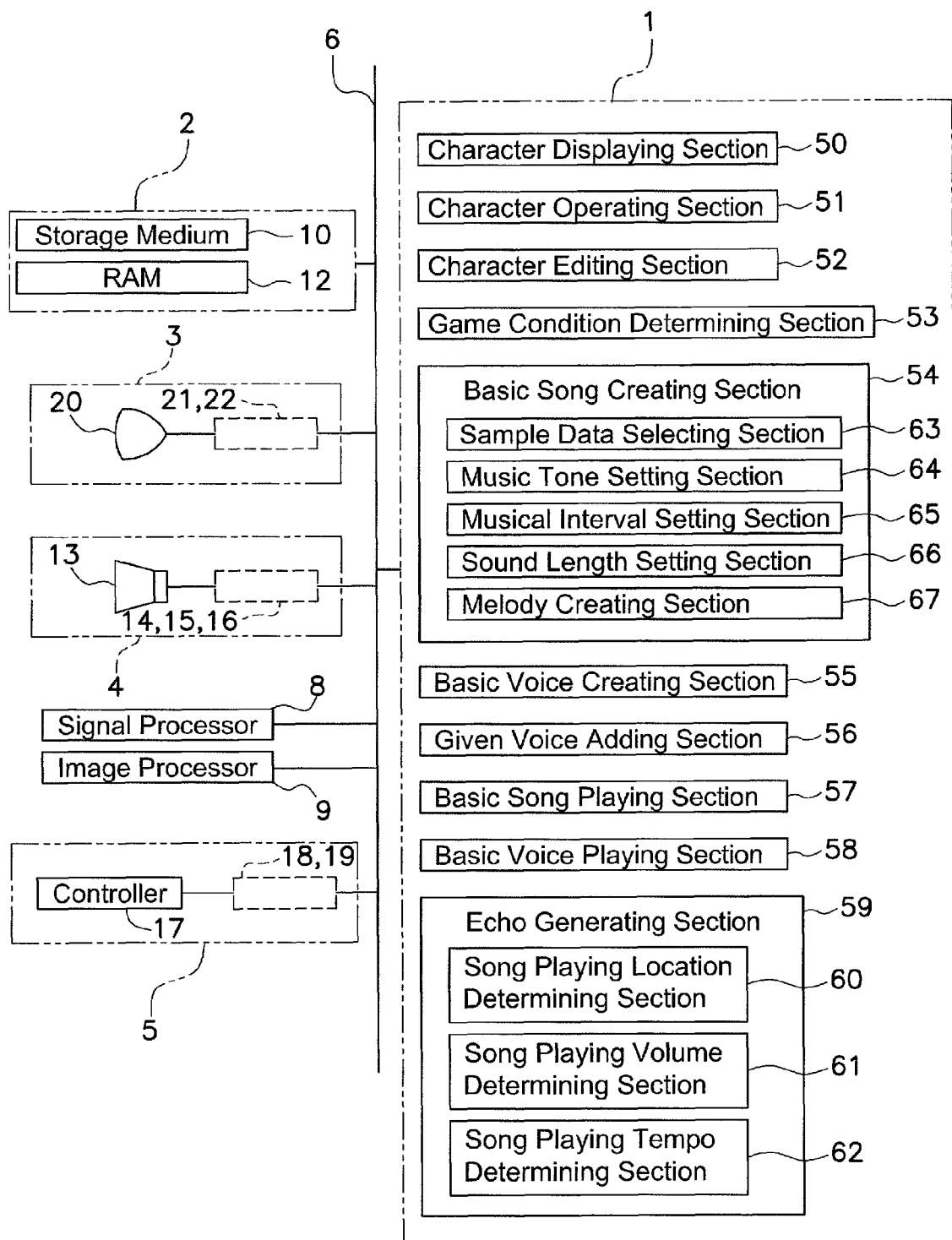
FIG. 2 is a function block diagram showing one example of the aforementioned video game device.

A baseball video game is executed by the game device, for example. The game device can realize a video game that operates video game characters that are displayed on the television monitor 20. FIG. 2 is a function block diagram illustrating functions that play principal roles in the present invention. The control portion 1 mainly includes a character displaying section 50, a character operating section 51, a character editing section 52, a game condition determining section 53, a basic song creating section 54, a basic voice creating section 55, a given voice adding section 56, a basic song playing section 57, a basic voice generating section 58, and an echo creating section 59. The echo creating section 59 includes a song playing location determining section 60, a song playing volume determining section 61, and a song playing tempo determining section 62.

Figure 12:
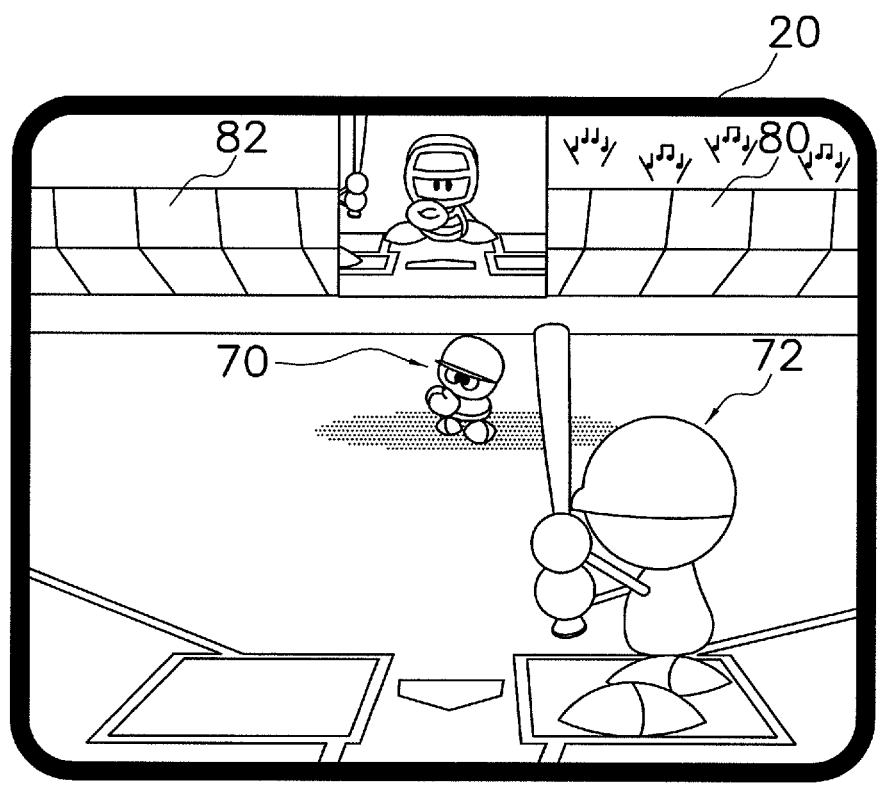
FIG. 12 is a view showing a cooperative video game screen in the case where a pitcher character and a batter character are displayed in the aforementioned baseball video game.

The character displaying section 50 serves to display a pitcher character 70, a batter character 72 and musical note characters 33 on the television monitor 20. The character displaying section 50 displays the pitcher character 70 and the batter character 72 as shown in FIG. 12 on the television monitor 20. Also, the character displaying section 50 displays musical note characters 33 on the television monitor 20 in a fight song creation screen 30 shown in FIG. 7.

This section provides pitcher image data corresponding to the pitcher character 70, batter image data corresponding to the batter character 72, and musical note image data corresponding to the musical note characters 33 from the storage portion 2 (e.g., the storage medium 10) to the RAM 12 when the game program is loaded. The pitcher image data corresponding to the pitcher character 70, batter image data corresponding to the batter character 72, and musical note image data corresponding to the musical note characters 33 are stored in the RAM 12. In this operation, the control portion 1 (e.g., the CPU 7) recognizes the pitcher image data, the pitcher coordinate data, and the musical note image data. Also, batter coordinate data, pitcher coordinate data and musical note coordinate data are provided from the storage portion 2 (e.g., the storage medium 10) to the RAM 12, and are stored in the RAM 12. The batter coordinate data, the pitcher coordinate data, and the musical note coordinate data are used to display the batter image data, the pitcher image data, and the musical note image data on the television monitor 20, respectively. In this operation, the control portion 1 (e.g., the CPU 7) recognizes the batter image data, the batter coordinate data, and the musical note image data. The batter image data, the pitcher image data, and the musical note image data that are stored in the RAM 12 are provided to the television monitor 20 via the image processor 9 based on commands by the CPU 7. The batter image data, the pitcher image data, and the musical note image data are displayed at predetermined positions on the television monitor 20 based on the batter coordinate data, the pitcher coordinate data, and the musical note coordinate data, respectively. Note that the CPU 7 issues the commands that display the batter image data, the pitcher image data and the musical note coordinate data at the predetermined positions on the television monitor 20.

The character operating section 51 serves to operate the pitcher character 70 and the batter character 72. The pitcher character 70 and the batter character 72 are operated by the character operating section 51.

The control portion 1 (e.g., the signal processor 8 and the image processor 9) as this section executes processing of the pitcher image data corresponding to the pitcher character 70 or the batter image data corresponding to the batter character 72 based on the commands from the CPU 7, when the control portion 1 (e.g., the CPU 7) recognizes a signal from the controller 17 that operate the pitcher character 70 or the batter character 72. The image data that is subjected to processing is then provided from the RAM 12 to the television monitor 20. Thus, the television monitor 20 displays a pitching motion of the pitcher character 70 and a bat swing motion of the batter character 72 as moving images.

The character editing section 52 serves to move the musical note characters 33 and to alter the shapes of the musical note characters 33. The musical note characters 33 are moved by the character editing section 52. The shapes of the musical note characters 33 are altered by the character editing section 52.

The control portion 1 (e.g., the signal processor 8 and the image processor 9) as this section executes processing of the musical note image data corresponding to the musical note characters 33 based on the commands from the CPU 7, when the control portion 1 (e.g., the CPU 7) recognizes a signal from the controller 17 that moves the musical note characters 33 or alter the shapes of the musical note characters 33. The image data that is subjected to processing is then provided from the RAM 12 to the television monitor 20. Thus, the television monitor 20 displays interval altering operation by the movement of the musical note characters 33 and the length altering operation by the alteration of the shape of the musical note characters 33 as moving images.

The game condition determining section 53 serves to determine whether a given game condition is satisfied in the baseball video game. In accordance with the game conditions in the baseball video game, the game condition determining section 53 accesses a game condition determination table 90 (see FIG. 16) that is stored by the storage portion 2, and determines whether a given game condition is satisfied based on a given game condition determination table 95 (see FIG. 17). In this case, the case where a given game condition is satisfied refers to the case where the control portion 1 (e.g., the CPU 7) determines which location the song playing location is set to and how high the song playing volume of the played song is set to. Variables in the game condition determination table 90 and game condition determination table 95 vary in accordance with the game conditions in the baseball video game. Various types of data are stored in the RAM 12.

The basic song creating section 54 servers to be able to create a given basic song. The basic song creating section 54 creates a given basic song as a trumpet and dram fight song that has a melody and a rhythm of a common theme song for a scoring opportunity for a team to which the batter character 72 belongs. The basic song creating section 54 includes a musical interval setting section 65, a sound length setting section 66, and a melody creating section. The musical interval setting section 65 sets the musical note character 33 at a musical interval position in a musical note input field 32 in the fight song creation screen 30 shown in FIG. 8. The sound length setting section 66 sets the sound length of the musical note character 33 that is set by the musical interval setting section 65. The melody generating section arranges a plurality of musical note characters 33 that are set by the musical interval setting section 65 and the sound length setting section 66, and creates a melody. The basic song creating section 54 further includes a sample data selecting section 63, and a music tone setting section 64. The sample data selecting section 63 selects a song in a sample data selection screen 37 shown in FIG. 4. The song includes a melody that is previously stored in the storage portion 2. The music tone setting section 64 sets the key and the tempo of a song in a music tone setting screen 40 shown in FIG. 5. In this embodiment, the created basic song data of the fight song is stored in the RAM 12.

The basic voice creating section 55 servers to be able to create a given basic voice. The basic voice creating section 55 creates given basic voice as a common encouraging shout for the team to which the batter character 72 belongs, such as "KATTOBASE ("We Want A Hit", as translated)", "MOERO! MOERO! ("Go For It! Go For It!", as translated)", "LET'S GO! LET'S GO!", "GO GO! LET'S GO!". The basic voice creating section 55 creates the voice when the player selects an encouraging shout pattern selection item 46*a* in an encouraging shout pattern selection screen 46 shown in FIG. 7. The created basic voice data of the fight song is stored in the RAM 12.

The given voice adding section 56 serves to add a given voice related to the batter character 72 or the team to which the batter character 72 belongs to the given basic voice that is created by the basic voice creating section 55 if the game condition determining section 53 determines that the given game condition is satisfied. If the game condition determining section 53 determines that a specific condition is satisfied, the given voice adding section 56 adds "the name (or nickname) of the batter character 72" to follow the encouraging shout such as "KATTOBASE", "MOERO! MOERO!", "LET'S GO! LET'S GO!", and "GO GO! LET'S GO!" The given voice adding section 56 accesses the game condition determination table 90 shown in FIG. 16 that is stored by the storage portion 2, and reads "the name (or nickname) of the batter character 72" as the given voice in accordance with the baseball video game conditions. The given voice is automatically added to the basic voice data of the fight song. The basic voice data of the fight song with the given voice added thereto is stored in the RAM 12.

The basic song playing section 57 servers to play the given basic song that is created by the basic song creating section 54. The basic song playing section 57 reads the given basic song as a trumpet and dram fight song that is created by the basic song creating section 54 and has a melody and a rhythm of a common theme song for a scoring opportunity for the team to which the batter character 72 belongs from the RAM 12. The given basic song as a trumpet and dram fight song is produced by the speaker 13 via the interface circuit 16, the D/A converter 15 and the amplification circuit 14 of the game sound producing portion 4.

The basic voice generating section 58 serves to play the fight song so that the given basic voice, and the given voice related to the batter character 72 or the team to which the batter character 72 belongs are superimposes on the given basic song. The given basic voice is created by the basic voice creating section 55. The given voice related to the batter character 72 or the team to which the batter character 72 belongs is added by the given voice adding section 56. The basic voice generating section 58 plays the trumpet and dram fight song that has a melody and a rhythm of a common theme song for a scoring opportunity in superposition of the trumpet and dram fight song and the encouraging shout such as "KATTOBASE, the name (or nickname) of the batter character 72", "MOERO! MOERO! the name (or nickname) of the batter character 72", "LET'S GO! LET'S GO! the name (or nickname) of the batter character 72", and "GO GO! LET'S GO! the name (or nickname) of the batter character 72". In this embodiment, the basic voice data of the fight song to which the given voice is added by the given voice adding section 56 is read from the RAM 12, and thus the given basic song as the trumpet and dram fight song is produced by the speaker 13 via the interface circuit 16, D/A converter 15, and the amplification circuit 14 of the game sound producing portion 4.

In this embodiment, the basic voice creating section 55 creates the common encouraging shout for the team such as "KATTOBASE", "MOERO! MOERO!", "LET'S GO! LET'S GO!", and "GO GO! LET'S GO!" The given voice adding section 56 adds "the name (or nickname) of the batter character 72" as the given voice related to the batter character 72 so that "the name (or nickname) of the batter character 72" follows the common encouraging shout for such as "KATTOBASE", "MOERO! MOERO!", "LET'S GO! LET'S GO!", and "GO GO! LET'S GO!" Accordingly, it is not necessary to create the fight song "KATTOBASE, the name (or nickname) of the batter character 72" for each batter character 72. Therefore, it is possible to reduce the data of game sound as a whole. As a result, the storage capacity of the memory is unlikely to be short. Also, it is possible to play fight songs "KATTOBASE, the name (or nickname) of the batter characters 72" for batter characters 72 differently from each batter character 72. Therefore, it is possible to provide a baseball video game with reality close to actual baseball games.

The echo creating section 59 includes the song playing location determining section 60, the song playing volume determining section 61, and the song playing tempo determining section 62. If the game condition determining section 53 determines that the given game condition is satisfied, the echo creating section 59 serves to produce game sound as if the given song related to the video game character is played at a song playing location that is determined by song playing location determining section 60. The generated game sound is played by the basic song playing section 57 and the basic voice generating section 58.

Figure 16:
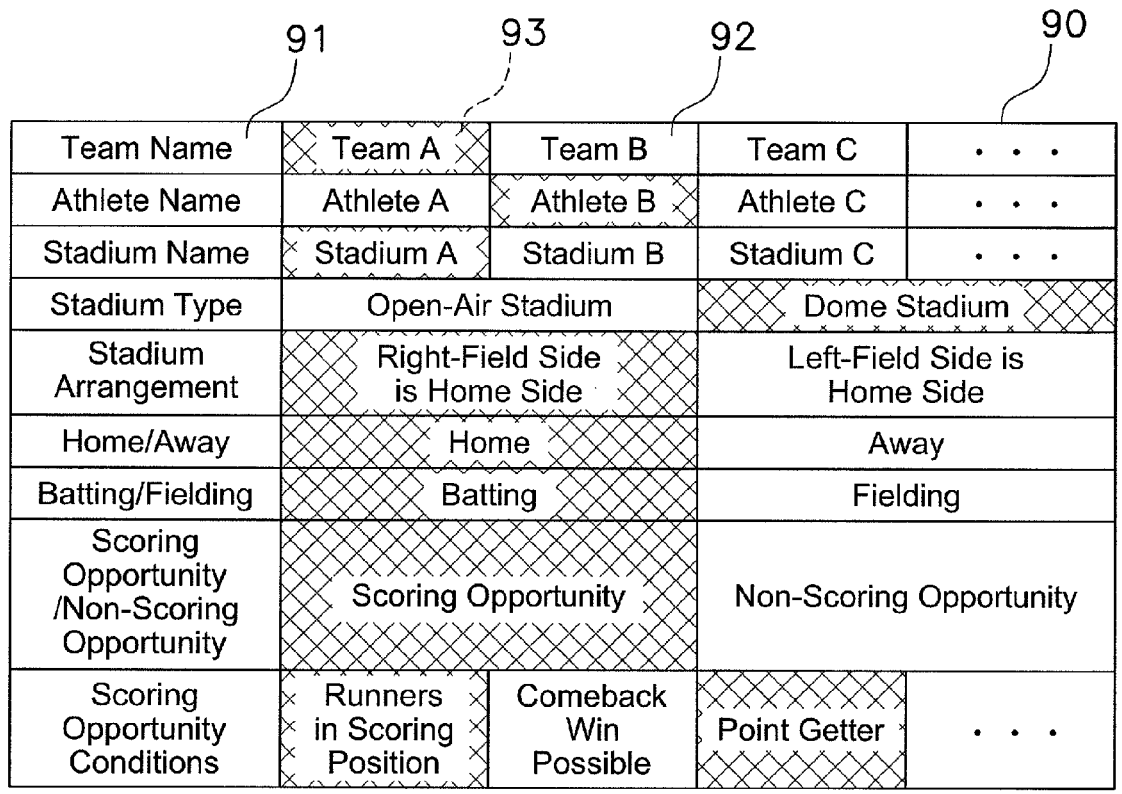
FIG. 16 is a diagram showing one example of a game condition determination table that is used in a game condition determination processing in the aforementioned fight song creation processing.
Figure 17:
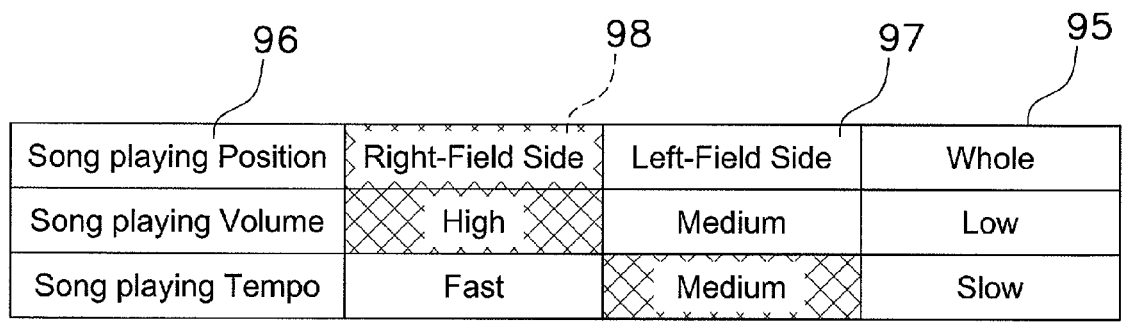
FIG. 17 is a diagram showing one example of a given game condition determination table that is used in the aforementioned game condition determination process in the aforementioned fight song creation process.

In accordance with a baseball video game condition, the game condition determining section 53 accesses the game condition determination table 90 (see FIG. 16) that is stored by the storage portion 2, and determines whether a given game condition is satisfied based on a given-game-condition determination table 95 (see FIG. 17). In this case, it is determined whether the given game condition is satisfied, where the given game condition can be an athlete name, the team name, a stadium name, a home/away team, a dome/open-air stadium, batting/fielding, scoring opportunity/non scoring opportunity, and the like.

If the video game condition determining section 53 determines that the given game condition is satisfied, the song playing location determining section 60 determines a song playing location where the given song such as the common theme song for a scoring opportunity for the team to which the batter character 72 belongs is played. For example, if the team that is selected by the player is a home team the supporters of which occupy the right stand side in large numbers, and the team is batting (see FIG. 16), the song playing location determination section 60 determines that the fight song is played on the right stand side (see FIG. 17).

If the video game condition determining section 53 determines that the given game condition is satisfied, the song playing volume determining section 61 determines a given song playing volume of the given song such as the common theme song for the batter character 72 or for a scoring opportunity for the team to which the batter character 72 belongs is played. For example, if the team that is selected by the player has a scoring opportunity, specifically, if the batter character 72 is a point getter and in the case of runners in scoring position (see FIG. 16), the song playing volume determining section 61 determines that the volume of the fight song to be played is higher than the left stand side (see FIG. 17). Also, in the case of a dome stadium (see FIG. 16), the song playing volume determining section 61 determines that the volume of the fight song to be played is higher as a whole (see FIG. 17).

If the video game condition determining section 53 determines that the given game condition is satisfied, the song playing tempo determining section 62 determines a given song playing tempo of the given song to be played such as the common theme song for the batter character 72, or for a scoring opportunity for the team to which the batter character 72 belongs. For example, if the team that is selected by the player has a scoring opportunity, specifically, if the batter character 72 is a point getter and in the case of runners in scoring position (see FIG. 16), the song playing tempo determining section 62 determines that the fight song is played at a fast tempo (see FIG. 17).

The RAM 12 stores the basic song data and the basic voice data of the fight song that is determined by the song playing location determining section 60, the song playing volume determining section 61, and the song playing tempo determining section 62.

The basic song playing section 57 and the basic voice generating section 58 read the basic song data and the basic voice data of the fight song that is determined by the song playing location determining section 60, the song playing volume determining section 61 and the song playing tempo determining section 62 from the RAM 12, and thus the game sound is produced by the speaker 13 via the interface circuit 16, the D/A converter 15, and the amplification circuit 14 of the game sound producing portion 4 as if the fight song is played on the right stand side.

In this embodiment, the basic song playing section 57 and the basic voice generating section 58 produce the game sound is produced as if the given song related to the batter character 72 is played on the right stand side that is determined by the song playing location determining section 60, for example. Accordingly, since the game sound is produced as if the fight song is played on the right stand side, it is possible to provide a baseball video game with reality close to actual baseball games and to improve a sense of realism in the video game.

Outline of Fight Song Creation Processing in Baseball Video Game

The following description specifically describes the fight song creation processing in the baseball video game with reference to display screens shown in FIG. 3 and later Figures that are displayed on the television monitor 20.

Figure 3:
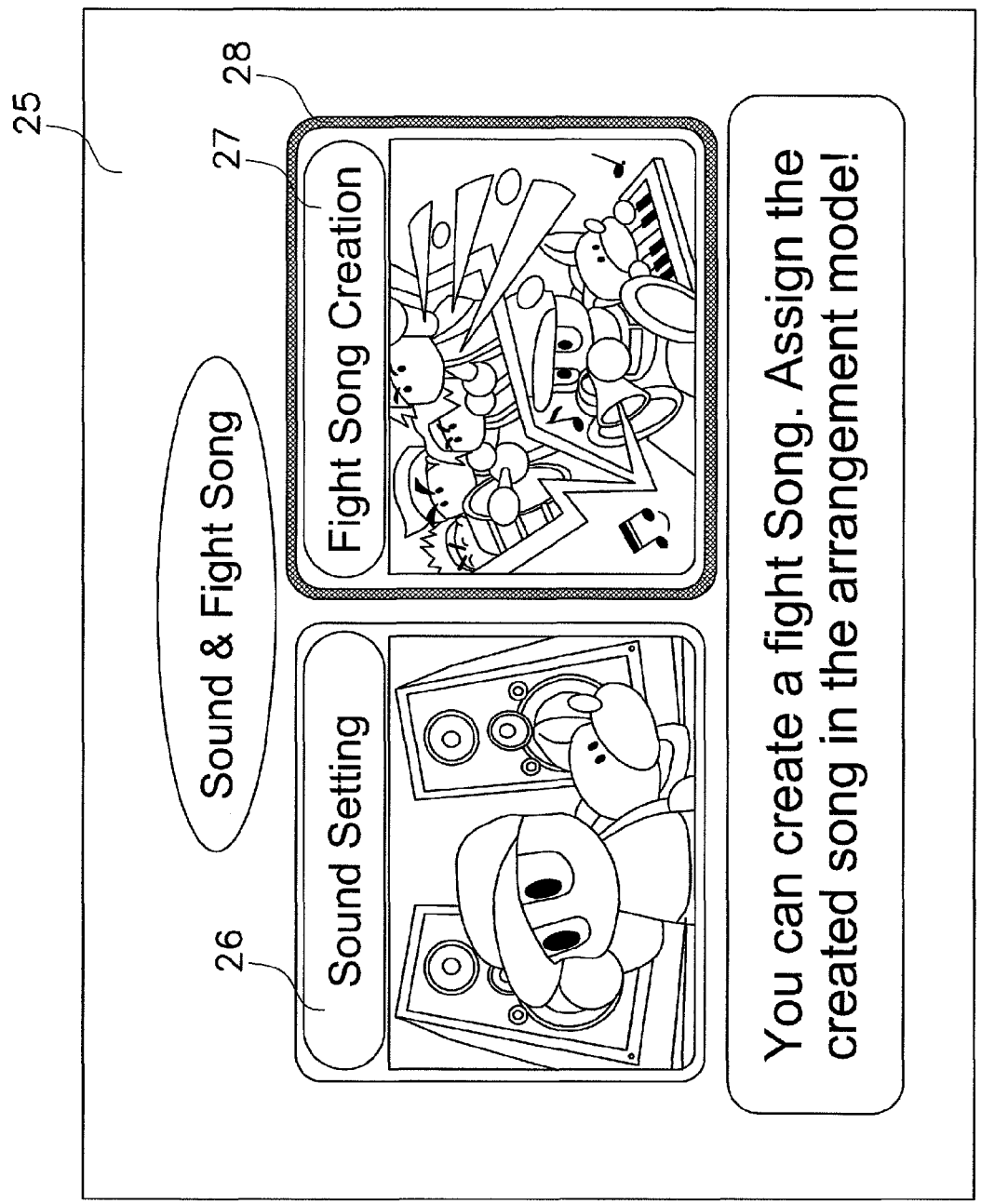
FIG. 3 is a view showing a sound setting/fight song creation select screen in a baseball video game.

In the baseball video game, in the case where the player creates the fight song, the player presses the start button 17e of the controller 17, and thus the sound setting/fight song creation selection screen 25 shown in FIG. 3 is displayed on the television monitor 20. The sound setting/fight song creation selection screen 25 includes a sound setting screen selection item 26 that is arranged on left side, and a fight song creation screen selection item 27 that is arranged on the right side of the sound setting screen selection item 26.

The textual characters of sound setting and fight song creation are arranged on the upper parts of substantially rectangular frames of the sound setting screen selection item 26 and the fight song creation screen selection item 27. The character graphic components of sound setting and fight song creation different form each other are arranged on the lower parts of the frames. A selection cursor 28 is displayed on the periphery of any of the sound setting screen selection item 26 and the fight song creation screen selection item 27 so that either the sound setting screen selection item 26 or the fight song creation screen selection item 27 is selected. The selection cursor 28 is displayed to movable leftward or rightward by the left key 17L or the right key 17R.

The selection cursor 28 is positioned on the periphery of the sound setting screen selection item 26 by press operation of the left key 17L or the right key 17R. If the second button 17b or the third button 17c is pressed in this state, a sound setting screen (not shown) will be displayed. On the sound setting screen, it is possible to make stereo setting that selects stereo or monophonic sound, surround stetting that turns a surround-sound effect ON/OFF, and volume setting that selects high/medium/low in the volume of play-by-play commentary, a female announcer, umpires, fight song, cheer and the like. Various types of setting are made, and a selection cursor is moved to a selection item (not shown) that completes the setting to store the various types of setting. The sound setting/fight song creation selection screen 25 is displayed again.

The selection cursor 28 is positioned on the periphery of the fight song creation screen selection item 27 by press operation of the left key 17L or the right key 17R. If the second button 17b or the third button 17c is pressed in this state, the fight song creation screen 30 shown in FIG. 8 will be displayed.

Figure 8:
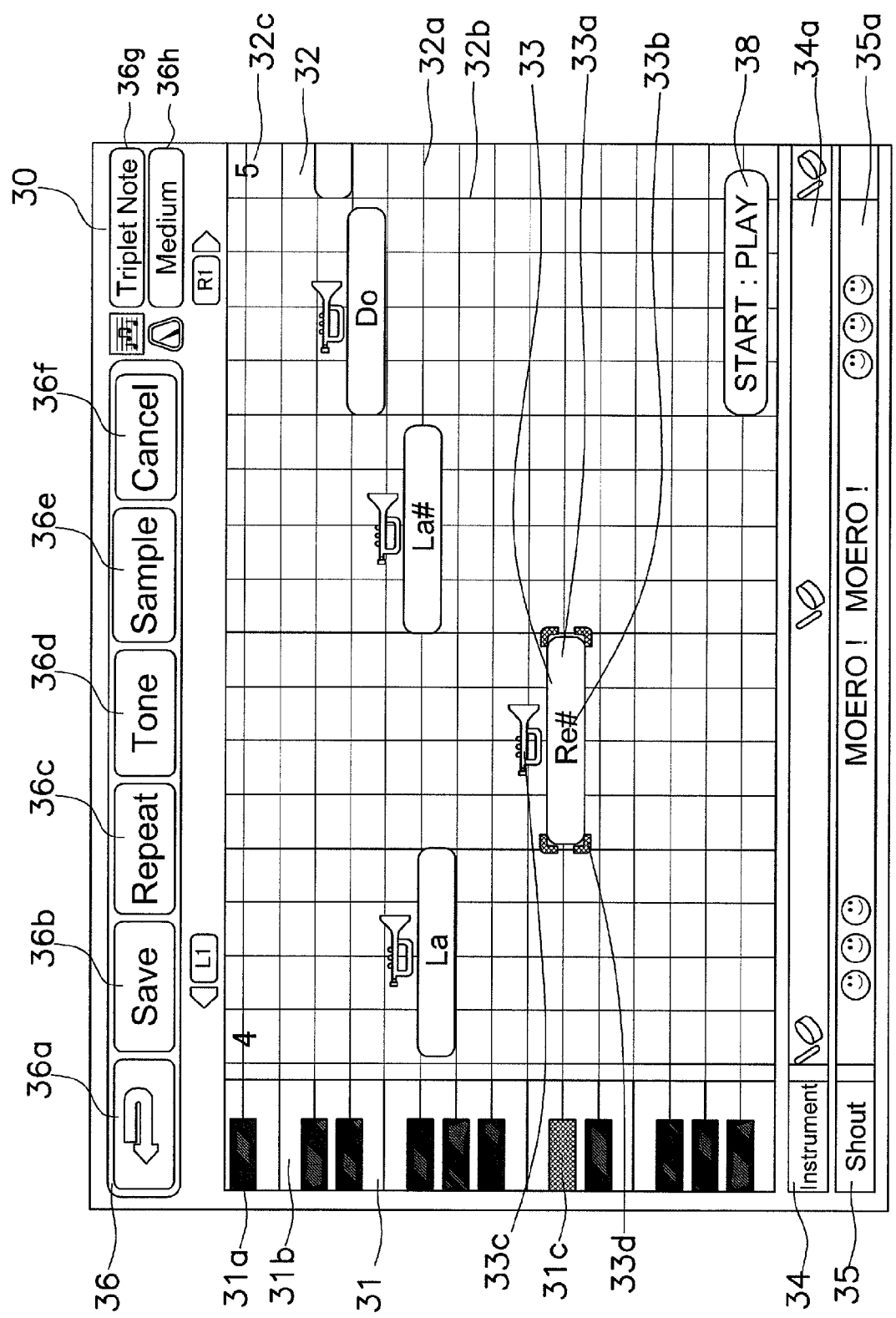
FIG. 8 is a view showing the aforementioned fight song creation screen in the case where musical note characters are arranged in a musical note input field.

The fight song creation screen 30 includes a piano keyboard 31, the musical note input field 32, a plurality of the musical note characters 33, a musical instrument pattern selection item 34, an encouraging shout pattern selection item 35, and various types of mode setting selection items 36 as shown in FIG. 8. The piano keyboard 31 is arranged on the left side to vertically extend. The musical note input field 32 is arranged on the right side of the piano keyboard 31, and provides an arrangement the vertical positions of which correspond to the intervals of the piano keyboard 31. The musical note characters 33 are arranged in the musical interval positions of the musical note input field 32. The musical instruments pattern selection item 34 and the encouraging shout pattern selection item 35 are vertically arranged adjacent to each other under the musical note input field 32. The mode setting selection items 36 are horizontally arranged as a plurality of selection items above the musical note input field 32.

Figure 4:
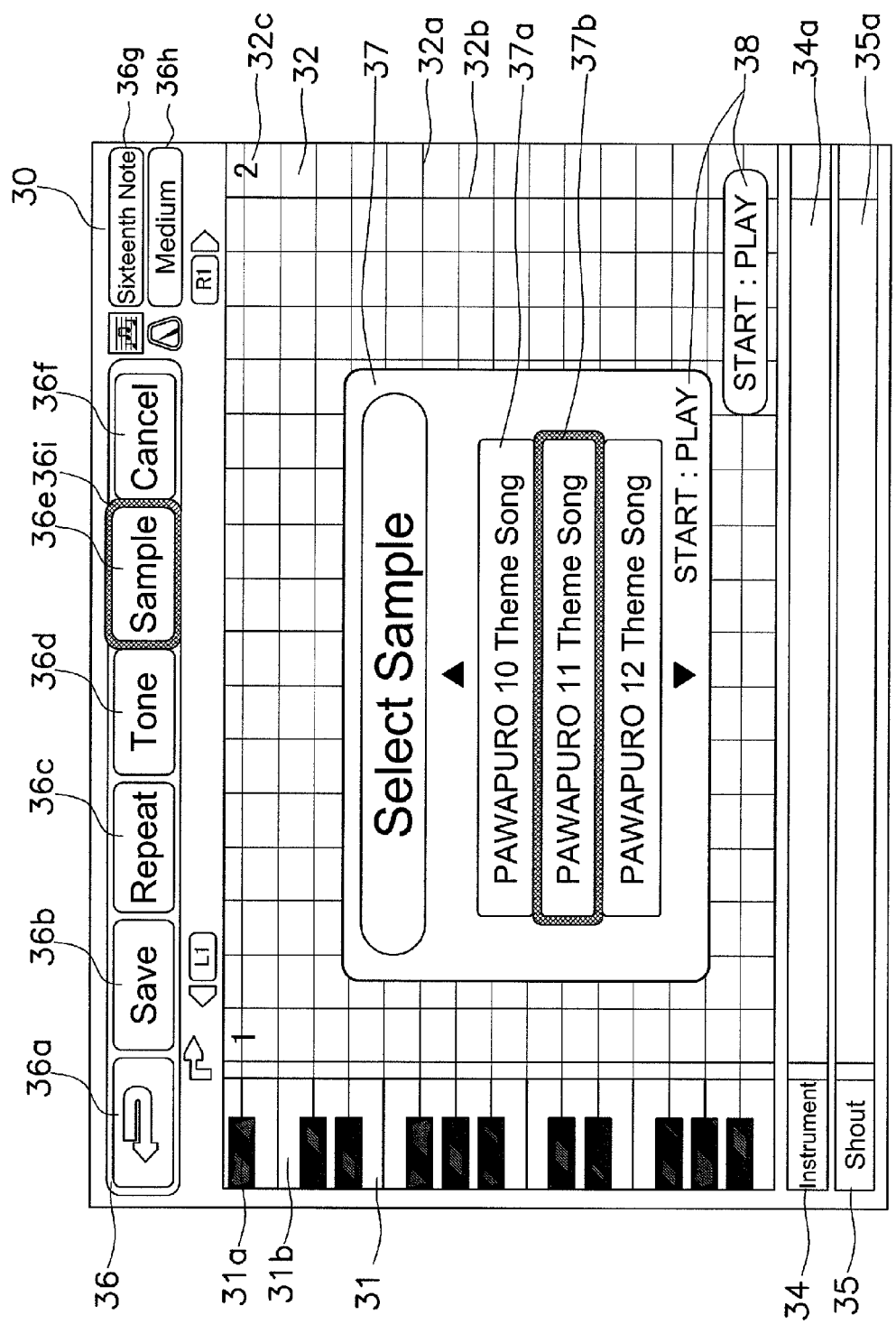
FIG. 4 is a view showing a sample data select screen in a fight song creation screen.
Figure 5:
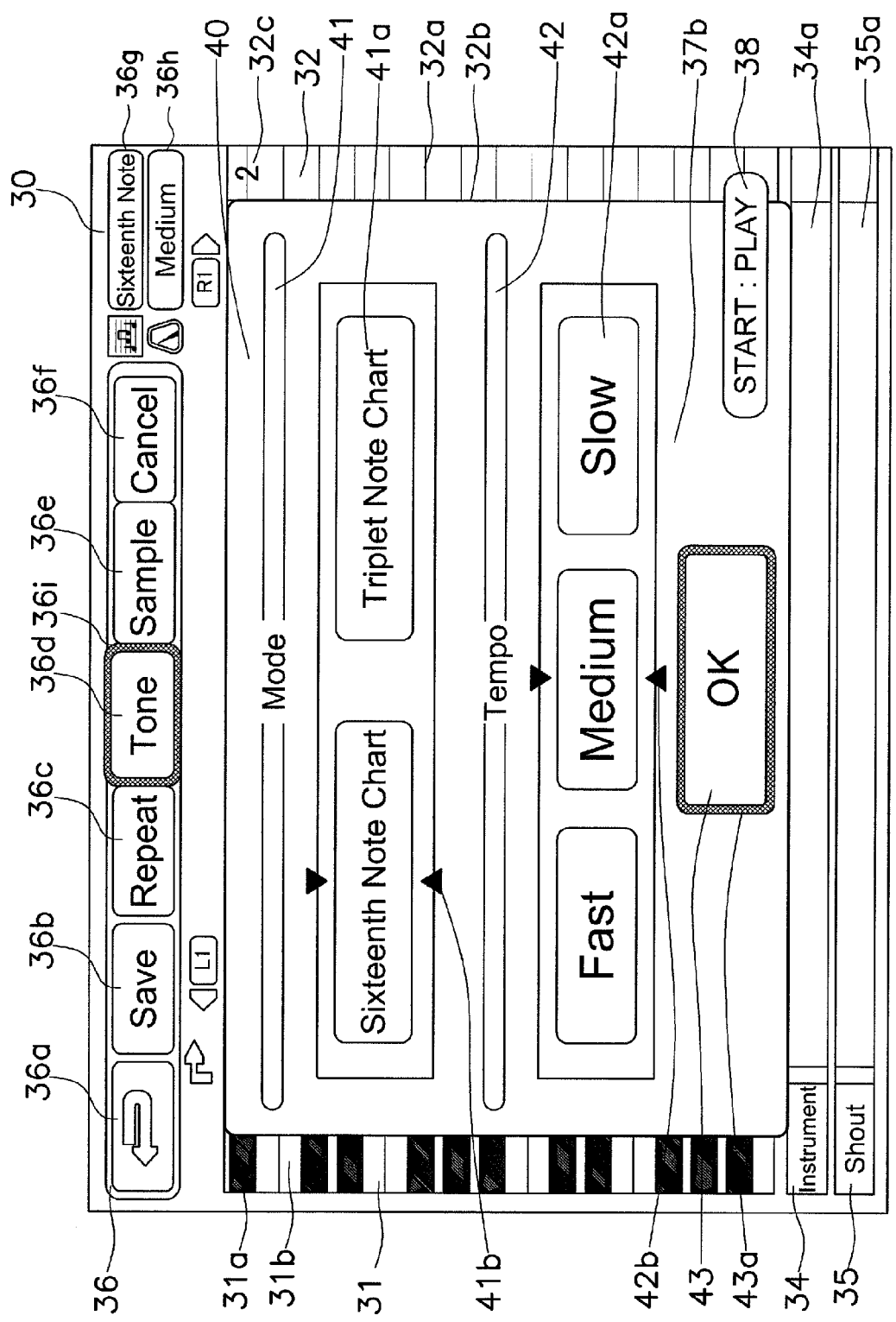
FIG. 5 is a view showing a melody setting display in the aforementioned fight song creation screen.

A selection item 36a, a selection item 36b, a selection item 36c, a music tone setting item 36d, a sample data selection setting item 36e, and a selection item 36f are arranged rightward from the left end as various types of mode setting selection items 36, as shown in FIG. 8. The selection item 36a of a graphic character of a return symbol is used to return the current screen to a previous screen. The selection item 36b is used for saving. The selection item 36c is used for repeating. The selection item 36f is used for canceling. A key setting display item 36g and a tempo setting display item 36h are arranged on the right side of the various types of mode setting selection items 36. The key setting display item 36g and the tempo setting display item 36h display the current key and tempo that are set in the music tone setting screen 40 (see FIG. 5). As for the selection items, a selection cursor 36i that is arranged on the periphery of a selection item is moved to the sample data selection setting item 36e (see FIG. 4) or the music tone setting item 36d (see FIG. 5) as shown in FIGS. 4 and 5 to select the item. In this embodiment, the selection cursor 36i is moved rightward or leftward by operation of the left key 17L or the right key 17R. When the second button 17b or the third button 17c is pressed in the state where the selection cursor 36i is positioned at the sample data selection setting item 36e (see FIG. 4) or the music tone setting item 36d (see FIG. 5), the selection item is selected.

In the state where the selection cursor 36i is positioned at the sample data selection setting item 36e when selection operation is performed, the sample data selection screen 37 shown in FIG. 4 will be displayed. In the sample data selection screen 37, songs that include melodies that are previously stored in the storage portion 2 can be selected. The sample data selection screen 37 includes a plurality of sample data selection items 37a, and a selection cursor 37b. The sample data selection items 37a are vertically arranged. The selection cursor 37b is positioned on the periphery of the sample data selection item 37a.

The title of sample data is displayed as textual characters in the sample data selection item 37a as shown in FIG. 4. For example, the textual character such as "PAWAPURO 11 Theme Song" is displayed in FIG. 4. Graphic characters that represent upward and downward arrow symbols are indicated above and under the sample data selection items 37a. When the selection cursor 37b is positioned on the upward or downward arrow symbol, other sample data selection items 37a that are not displayed on the sample data selection screen 37 can be scrolled up or down.

In this embodiment, the selection cursor 37b is moved upward or downward by operation of the up key 17U or the down key 17D. When the second button 17b or the third button 17c is pressed in the state where the selection cursor 37b is positioned at the sample data selection item 37a such as "PAWAPURO 11 Theme Song", a desired sample data component is selected. When the desired sample data component is selected, the current screen is switched into the fight song creation screen 30 shown in FIG. 8, and the musical note character 33, the musical instruments pattern selection item 34, and the encouraging shout pattern selection item 35 corresponding to the sample data component are automatically provided.

Note that, in the sample data selection screen 37, when the start button 17e is pressed in the state where the selection cursor 37b is positioned at the sample data selection item 37a, the song corresponding to the selected sample data selection item 37a will be played. Also, a button operation guidance item 38 of textual character "START: PLAY" is arranged at the lower right of the sample data selection screen 37. In this embodiment, the player can easily perform various types of operation according to the direction from the button operation guidance item 38.

In the state where the selection cursor 36i is positioned at the music tone setting item 36d when selection operation is performed, the music tone setting screen 40 shown in FIG. 5 will be displayed. The music tone setting screen 40 includes a key setting screen 41, and a tempo setting screen 42. The key setting screen 41 is arranged on the upper part of the music tone setting screen 40, and sets music tone. The tempo setting screen 42 is arranged on the lower side of the key setting screen 41, and sets a tempo. Also, a selection item 43 of textual characters "OK" is arranged under the key setting screen 41 and the tempo setting screen 42. In addition, in the music tone setting screen 40, a selection cursor 44 is displayed on the periphery of the item in the key setting screen 41 or the tempo setting screen 42, or the selection item 43 that is used to accept the selection. The selection cursor 44 can be moved upward, downward, leftward and rightward.

The key setting screen 41 includes a plurality of key selection items 41a, and selection symbols 41b, as shown in FIG. 5. The key selection items 41a are horizontally arranged. The selection symbols 41b are arrow symbols that are arranged on the upper and lower sides of the key selection item 41a to be opposed to each other. The key selection items 41a are two items "Sixteenth Musical note" and "Triplet Musical note". In FIG. 5, the selection symbols 41b are arranged on the upper and lower sides of the key selection item 41a "Sixteenth Musical note". Thus, the key selection item 41a "Sixteenth Musical note" is selected.

The tempo setting screen 42 includes a plurality of tempo selection items 42a, and selection symbols 42b, as shown in FIG. 5. The tempo selection items 42a are horizontally arranged. The selection symbols 42b are arrow symbols that are arranged on the upper and lower sides of the tempo selection item 42a to be opposed to each other. The tempo selection items 42a are three items "Fast", "Medium" and "Slow". In FIG. 5, the selection symbols 42b are arranged on the upper and lower sides of the tempo selection item 42a "Medium". Thus, the tempo selection item 42a "Medium" is selected.

In this selection state, when the second button 17b or the third button 17c is pressed in the state where the selection cursor 44 is positioned at the selection item 43, the music tone is set. When the desired music tone is selected, the current screen is switched into the fight song creation screen 30 shown in FIG. 8, and textual character "Sixteenth Musical note" and "Medium" are displayed in the key setting display item 36g and the tempo setting display item 36h, respectively, at the upper right of the fight song creation screen 30.

Note that, in the key setting screen 41, when the start button 17e is pressed in the state where the selection symbols 41b and 42b are positioned on the upper and lower sides of the desired key selection item 41a and the desired tempo selection item 42, respectively, the song will be played at the selected key and tempo. Also, the button operation guidance item 38 of textual character "START: PLAY" is arranged at the lower right of the key setting screen 41. In this embodiment, the player can easily perform various types of operation according to the direction from the button operation guidance item 38.

In FIG. 8, when selection operation is performed in the state where a later-discussed selection cursor 33d of the musical note character 33 is positioned at the musical instrument pattern selection item 34 in the musical instrument pattern display field 34a, a musical instrument pattern selection screen 45 shown in FIG. 6 will be displayed. In the musical instrument pattern selection screen 45, drum beat patterns that do not include a melody can be selected. The musical instrument pattern selection screen 45 includes a plurality of musical instrument selection items 45a, and a selection cursor 45b. The musical instrument selection items 45a are vertically arranged. The selection cursor 45b is positioned on the periphery of the musical instrument selection item 45a.

The musical instrument pattern selection item 45a is displayed in combination of a textual character such as "Pattern 1:" and graphic characters of drums and spaces. For example, "Pattern 1: drum graphic character, space, drum graphic character, space, drum graphic character, space, and drum graphic character" is shown as the musical instrument pattern selection item 45a in FIG. 6. In this case, the drum graphic character represents a drum beat, and the space represents a rest. Any drum beat patterns can be set by the combination of the drum graphic character and the space. Also, graphic characters that represent upward and downward arrow symbols are indicated above and under the musical instrument pattern selection item 45a. When the selection cursor 45b is positioned at the upward or downward arrow symbol, other sample musical instrument pattern selection items 45a that are not displayed on the musical instrument pattern selection screen 45 can be scrolled up or down. In this embodiment, the selection cursor 45b is moved upward or downward by operation of the up key 17U or the down key 17D. When the second button 17b or the third button 17c is pressed in the state where the selection cursor 45b is positioned at the musical instrument pattern selection item 45a such as "Pattern 1: drum graphic character, space, drum graphic character, space, drum graphic character, space, and drum graphic character", the desired drum beat pattern is selected. When the desired drum beat pattern is selected, the current screen is switched into the fight song creation screen 30 shown in FIG. 8, and the selected drum beat pattern will be displayed in the musical instrument pattern display field 34*a*.

Note that, in the musical instrument pattern selection screen 45, when the start button 17*e* is pressed in the state where the selection cursor 45*b* is positioned at the musical instrument pattern selection item 45*a*, the song corresponding to the selected drum beat pattern will be played. Also, the button operation guidance item 38 of textual character "START: PLAY" is arranged at the lower right of the musical instrument pattern selection screen 45. In this embodiment, the player can easily perform various types of operation according to the direction from the button operation guidance item 38.

In FIG. 8, when selection operation is performed in the state where the later-discussed selection cursor 33*d* of the musical note character 33 is positioned at an encouraging shout pattern display field 35*a* of an encouraging shout pattern selection item 35, an encouraging shout pattern selection screen 46 shown in FIG. 7 will be displayed. In the encouraging shout pattern selection screen 46, the common encouraging shout for the team to which the batter character 72 belongs, such as "KATTOBASE", "MOERO! MOERO!", "LET'S GO! LET'S GO!", and "GO GO! LET'S GO!", can be selected. The encouraging shout pattern selection screen 46 includes a plurality of encouraging shout pattern selection items 46*a*, and a selection cursor 46*b*. The encouraging shout pattern selection items 46*a* are vertically arranged. The selection cursor 46*b* is positioned on the periphery of the encouraging shout pattern selection item 46*a*.

Figure 7:
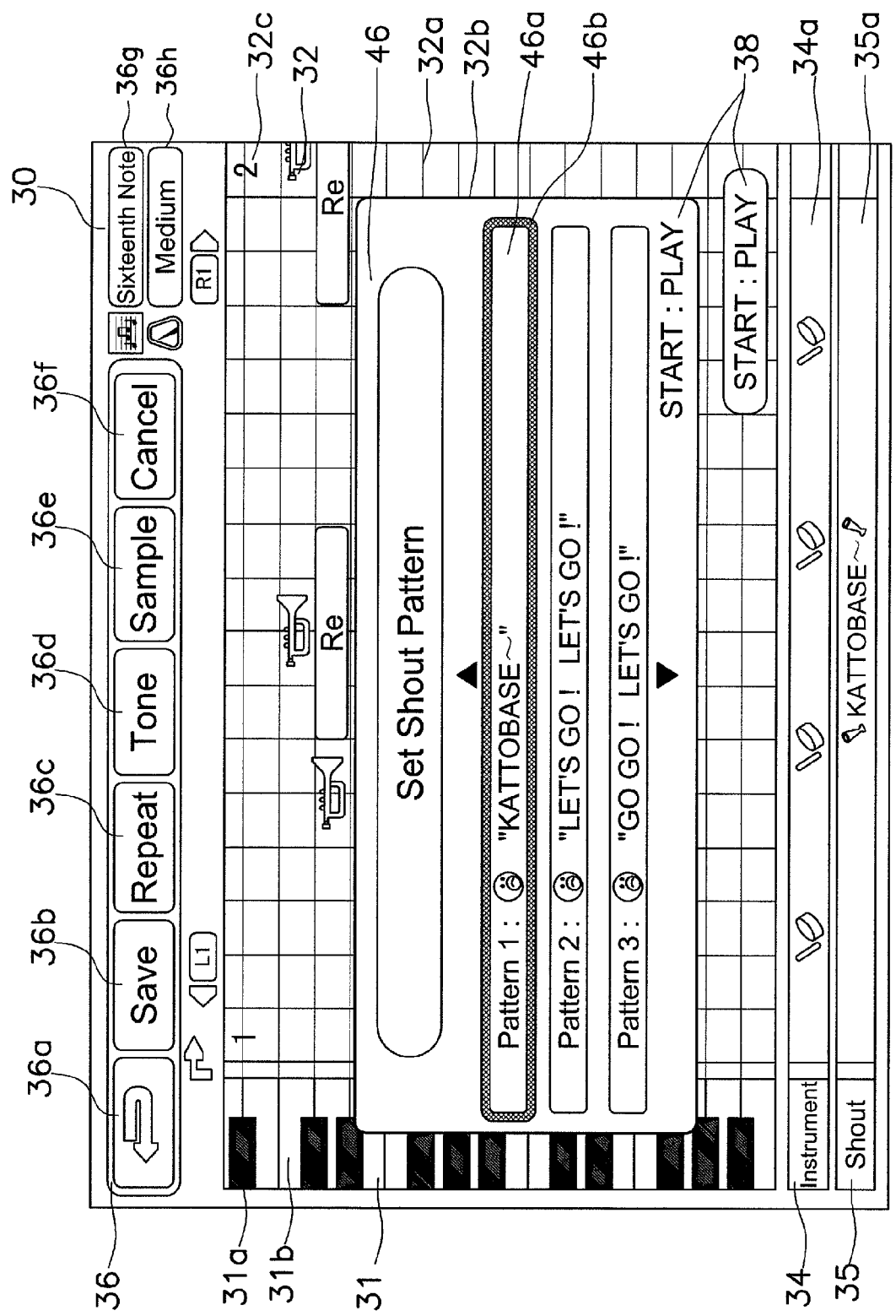
FIG. 7 is a view showing an encouraging shout pattern select screen in the aforementioned fight song creation screen.

As shown in FIG. 7, the textual characters such as "Pattern 1: KATTOBASE", "Pattern 2: LET'S GO! LET'S GO!" and "Pattern 3: GO GO! LET'S GO!" are displayed in the encouraging shout pattern selection items 46*a*. In this case, the textual character represents sound that is actually produced by humans, and the sound of the displayed textual character is produced as a voice. Also, graphic characters that represent upward and downward arrow symbols are indicated above and under the encouraging shout pattern selection items 46*a*. When the selection cursor 46*b* is positioned on the upward or downward arrow symbol, other encouraging shout pattern selection items 46*a*, e.g., "Pattern 4: MOERO! MOERO!" (not shown) that are not displayed on the encouraging shout pattern selection screen 46 can be scrolled up or down. In this embodiment, the selection cursor 46*b* is moved upward or downward by operation of the up key 17U or the down key 17D. When the second button 17*b* or the third button 17*c* is pressed in the state where the selection cursor 46*b* is positioned at the encouraging shout pattern selection item 46*a* such as "Pattern 1: KATTOBASE", the desired encouraging shout pattern is selected. When the desired encouraging shout pattern is selected, the current screen is switched into the fight song creation screen 30 shown in FIG. 8, and the selected encouraging shout pattern will be displayed in the encouraging shout pattern display field 35*a*.

Note that, in the encouraging shout pattern selection screen 46, when the start button 17*e* is pressed in the state where the selection cursor 46*b* is positioned at the encouraging shout pattern selection item 45*a*, the song corresponding to the selected drum beat pattern will be played. Also, the button operation guidance item 38 of textual character "START: PLAY" is arranged at the lower right of the encouraging shout pattern selection screen 46. In this embodiment, the player can easily perform various types of operation according to the direction from the button operation guidance item 38.

The following description describes the piano keyboard 31, the musical note input field 32 and the musical note characters 33 in the fight song creation screen 30 shown in FIG. 8.

As shown in FIG. 8, the piano keyboard 31 is composed of a graphic character in imitation of an actual piano keyboard, and includes black keys 31*a* and white keys 31*b* that are vertically arranged at the predetermined musical interval positions. If the musical note character 33 corresponding to the black key 31*a* or the white key 31*b* is selected (the interval position corresponding to #Re in FIG. 8), a selected key 31*c* (the black key position of #Re in FIG. 8) is displayed in a color different from other normal colors of the black keys 31*a* and the white keys 31*b*, in the piano keyboard 31. The thus-displayed selected key 31*c* allows the player to immediately see which musical note character 33 is selected.

As shown in FIG. 8, the musical note input field 32 has musical interval unit lines 32*a* and sound length unit lines 32*b*. The musical interval unit lines 32*a* are vertically arranged. The musical interval unit line 32*a* is composed of a straight line that horizontally extends. The sound length unit lines 32*b* are horizontally arranged in perpendicular to the musical interval unit lines 32*a*. The sound length unit line 32*b* is composed of a straight line that vertically extends. The musical interval unit lines 32*a* are drawn at the same interval as the height of the white key 31*b* of the piano keyboard 31, and are connected to the vertically-arranged lines of the white keys 31*b*. A line wider than other lines is drawn for every four lines among the sound length unit lines 32*b*. In addition to this, a line with width and color tone different from other lines is drawn for every sixteen lines to represent one bar. The current and next bar numbers 32*c* are displayed at the upper left position and the upper right position in the musical note input field 32, respectively (forth and fifth bars in the case of FIG. 8). The displayed bar part can be moved to the previous or next bar part by operation of the L1 button 17L1 or the R1 button 17R1 of the controller 17.

The musical note characters 33 can be arranged at any positions that are defined by the musical interval unit lines 32*a* and the sound length unit lines 32*b* in the musical note input field 32 as shown in FIG. 8. In this embodiment, the musical interval is specified by the height position in the vertical direction of the musical note character 33, and the sound length is specified by the length in the horizontal direction of the musical note character 33. A melody is set by the combination of the musical intervals and the sound lengths of the musical note characters 33. The musical note character 33 includes a substantially rectangular character 33*a*, a textual character 33*b*, a graphic character 33*c*, and selection cursor portions 33*d*, as shown in FIG. 8. The rectangular character 33*a* has shorter sides that are slightly shorter than the interval of the musical interval unit lines 32*a*, and longer sides the length of which is variable. The textual character 33*b* is arranged in the middle of the rectangular character 33*a*, and represents the musical interval. The graphic character 33*c* is composed of graphic information such as a trumpet, and is arranged substantially in the middle above the rectangular character 33*a*. The selection cursor portions 33*d* are arranged at the four corners of the rectangular character 33*a*, and represent that the rectangular character 33*a* is selected.

Figure 9:
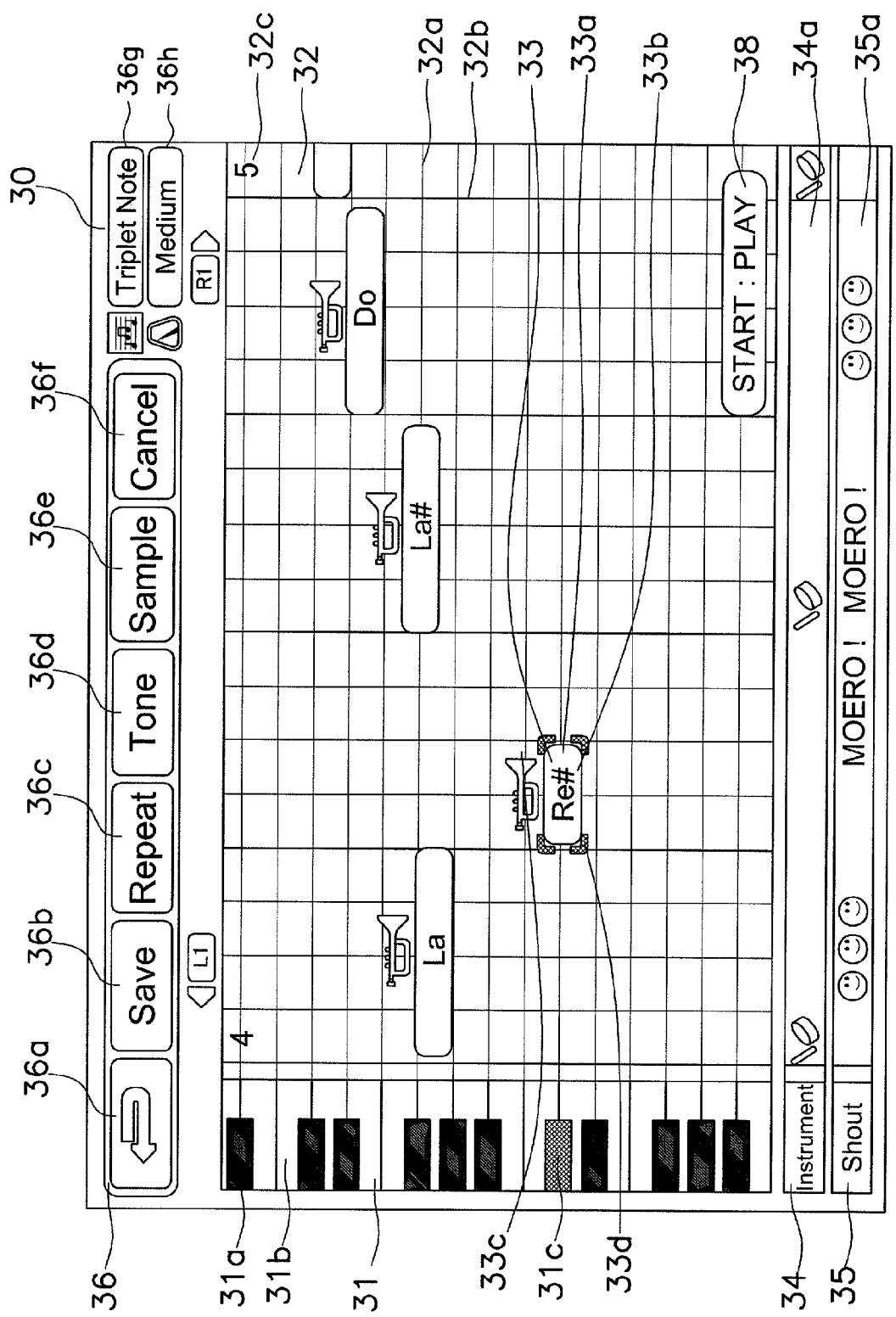
FIG. 9 is a view showing the aforementioned fight song creation screen in the case where the length (horizontal length) of a musical note character is altered.

The rectangular character 33*a* has a substantially rectangular shape with rounded four corners. The rectangular character 33*a* can be arranged at a height position on the musical interval unit line 32*a* (a position corresponding to the black key 31*a*) or at a height position between the musical interval unit lines 32*a* (a position corresponding to the white key 31*b*) to specify the musical interval of the rectangular character 33a. Also, the horizontal length of the rectangular character 33a can be adjusted to any length to specify the sound length of the rectangular character 33a. For example, while the rectangular character 33a at the musical interval position corresponding to #Re has a horizontal length of four units in FIG. 8, the rectangular character 33a at the musical interval position corresponding to #Re has a horizontal length of two units in FIG. 9. Thus, the horizontal length of the rectangular character 33a can be adjusted to any length.

In order to adjust the horizontal length of the rectangular character 33a, the selection cursor 33d is moved to the rectangular character 33a at the musical interval position corresponding to #Re by operation of the up key 17U, the down key 17D, the left key 17L, or the right key 17R. Subsequently, if the player operates the left key 17L or the right key 17R while pressing the second button 17b or the third button 17c, the right end of the rectangular character 33a can be horizontally moved (see FIG. 8). In the state where the horizontal length of the rectangular character 33a is adjusted to a desired length by operation of the left key 17L or the right key 17R under pressing operation of the second button 17b or the third button 17c, if the player stops the pressing operation of the second button 17b or the third button 17c, the horizontal length of the rectangular character 33a is set at the position of the right end of the rectangular character 33a (see FIG. 9). In this embodiment, since the horizontal length of the rectangular character 33a is set when the player stops the pressing operation of the second button 17b or the third button 17c, the player can easily operate to set the horizontal length of the rectangular character 33a as compared with the case where the player presses the second button 17b or the third button 17c again to set the horizontal length of the rectangular character 33a.

Figure 10:
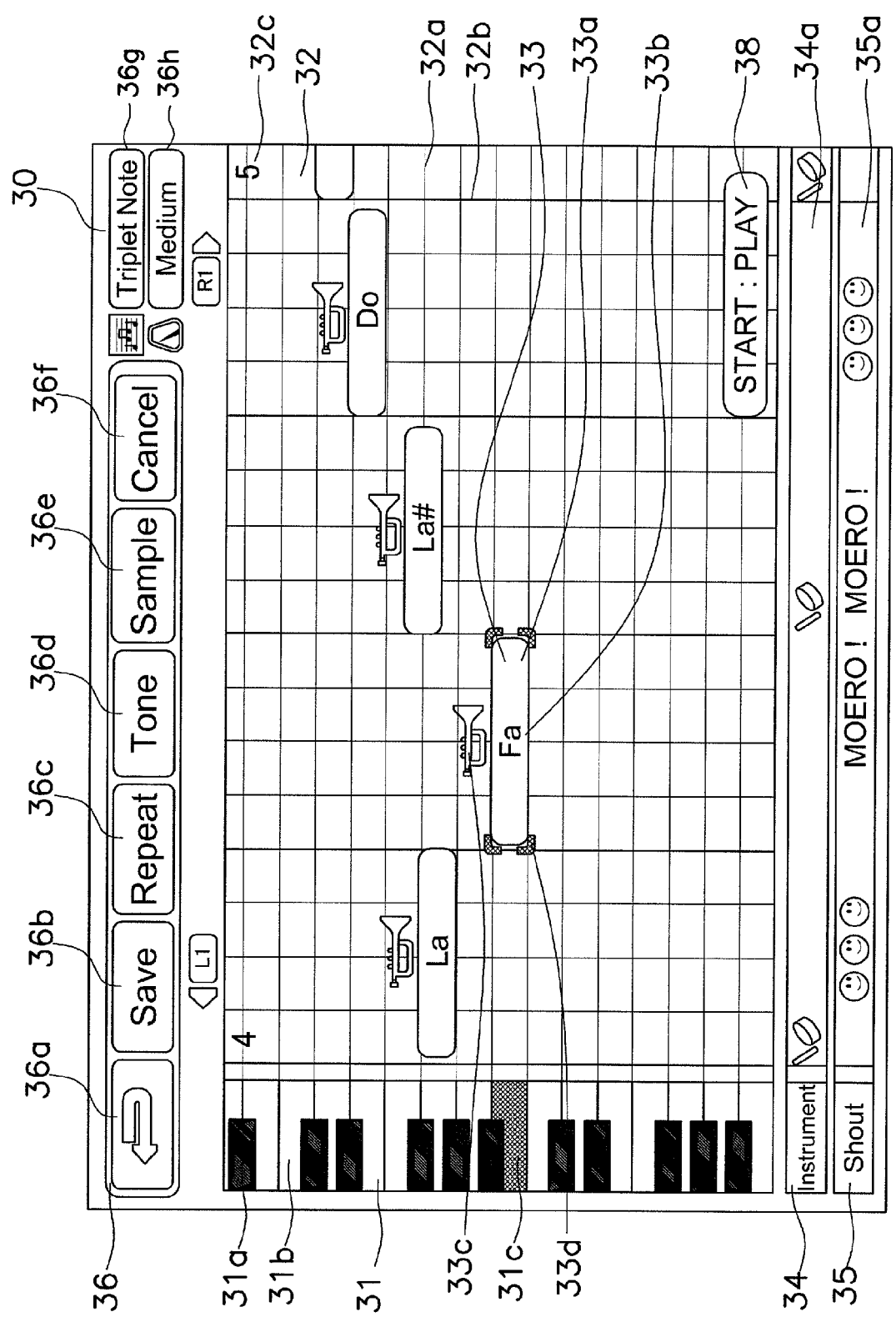
FIG. 10 is a view showing the aforementioned fight song creation screen in the case where the interval (vertical position) of the aforementioned musical note character is changed.

Also, in order to adjust the vertical position of the rectangular character 33a, the selection cursor 33d is moved to the rectangular character 33a at the musical interval position corresponding to #Re by operation of the up key 17U, the down key 17D, the left key 17L, or the right key 17R. Subsequently, if the player operates the up key 17U or the down key 17D while pressing the second button 17b or the third button 17c, the rectangular character 33a can be vertically moved (see FIG. 8). In the state where the vertical, height position of the rectangular character 33a is adjusted to a desired position by operation of the up key 17U or the down key 17D under pressing operation of the second button 17b or the third button 17c, if the player stops the pressing operation of the second button 17b or the third button 17c, the vertical, height position of the rectangular character 33a is set at the position of the rectangular character 33a (at the position corresponding to Fa sound, in the case of FIG. 10). In this embodiment, since the vertical position of the rectangular character 33a is set when the player stops the pressing operation of the second button 17b or the third button 17c, the player can easily operate to set the vertical, height position of the rectangular character 33a as compared with the case where the player presses the second button 17b or the third button 17c again to set the vertical position of the rectangular character 33a. Note that, in FIG. 10, the selection cursor portions 33d are arranged on the periphery of the rectangular character 33a at the musical interval position of Fa sound, and thus the white key at the position of Fa sound as the selected key 31c is filled with a color tone different from normal keys.

A plurality of the rectangular characters 33a are thus arranged to adjust the vertical, height positions and the horizontal lengths of the rectangular characters 33a, therefore, it is possible to provide a user interface that allows the player to easily operate to create a basic song with a melody.

If the player performs selection operation in the state where the selection cursor 36i is positioned at the selection item 36b among the various types of mode setting selection items 36 that is used to save a song, the song that is thus created by the player as data associated with the batter character 72 can be saved in the storage portion 2 as a name that is given to the song. Accordingly, in the case where the batter character 72 is at bat, the song that is created by the player is automatically played. Also, the song that is created by the player can be read to edit the song again if necessary, or can be deleted. In addition to this, the song can be converted with a password that is composed of a random string of HIRAGANA characters (Japanese symbols) to exchange the song with other players.

Also, in the fight song creation screen 30 shown in FIG. 8, if the start button 17e is pressed, the completed song is played so that the drum and the voice of the encouraging shout are superimposed on the song. Also, the button operation guidance item 38 of textual character "START: PLAY" is arranged at the lower right of the fight song creation screen 30. In this embodiment, the player can easily perform various types of operation according to the direction from the button operation guidance item 38.

Figure 11:
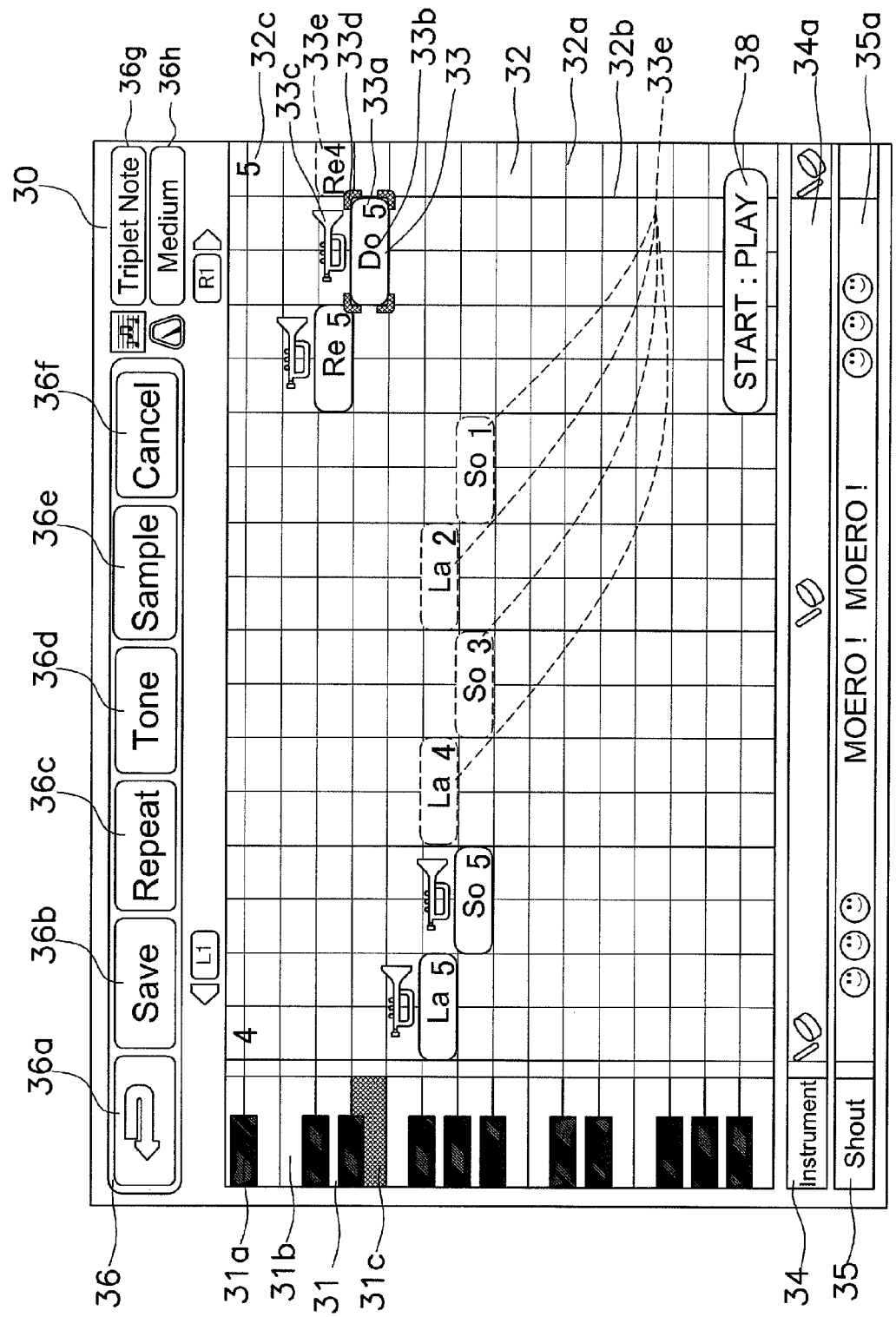
FIG. 11 is a view showing the aforementioned fight song creation screen in the case where musical note characters of echo sound corresponding to the aforementioned musical note characters are arranged as phantom lines.

Also, in the case where the song is created by the player in the fight song creation screen 30, as shown in FIG. 11, phantom rectangular characters 33e are automatically created to be shifted rightward to the rest positions where the rectangular characters 33a are not arranged to have the same combination of the vertical, height positions and the horizontal lengths as the rectangular characters 33a that are arranged by the player (the musical intervals of La, So, Re and Do in the case of FIG. 11) so that the song playing volumes of the phantom rectangular characters 33e are smaller than the song playing volumes of the rectangular characters 33s. Specifically, two phantom rectangular characters 33e at each of the musical interval positions La and So are automatically created at the rest positions on the right side of the rectangular character 33a at each of the musical interval positions of La and So that are arranged by the player. Also, one phantom rectangular character 33e at each of the musical interval positions Re and Do is automatically created at the rest position on the right side of the rectangular character 33a at each of the musical interval positions of Re and Do that are arranged by the player. Note that the number of the phantom rectangular characters 33e that are automatically created is automatically determined so that the phantom rectangular characters 33e are arranged to the starting position of the next rectangular character 33a that is arranged by the player.

In addition to this, the song playing volumes of the first phantom rectangular characters 33e at the musical interval positions of La and So (volumes of 4 and 3 for La and So, respectively, in the case of FIG. 11) are set smaller than the song playing volumes of the rectangular characters 33a at the musical interval positions of La and So that are arranged by the player (a volume of 5 for both La and So). The song playing volumes of the second phantom rectangular characters 33e at the musical interval positions of La and So (volumes of 2 and 1 for La and So, respectively) are set smaller than the song playing volumes of the first phantom rectangular characters 33e at the musical interval positions of La and So (volumes of 4 and 3 for La and So, respectively). The song playing volume of the one phantom rectangular character 33e at each of the musical interval positions of Re and Do (volumes of 4 and 3 for Re and Do, respectively) is set smaller than the song playing volume of the rectangular character 33a at each of the musical interval positions of Re and Do that are arranged by the player (a volume of 5 for both Re and Do). In this embodiment, as the phantom rectangular character 33e is arranged rightward further away from the rectangular characters 33a, the song playing volume of the phantom rectangular character 33e is set smaller. Therefore, the song can fade out when getting close to the song play stop time.

The song playing volumes of the phantom rectangular characters 33e at the musical interval position So (volumes of 3 and 1 for the first and second phantom rectangular characters 33e, respectively) are set smaller than the song playing volumes of the phantom rectangular characters 33a at the musical interval position of La (volumes of 4 and 2 for the first and second phantom rectangular characters 33e, respectively). The song playing volume of the phantom rectangular character 33e at the musical interval position Do (a volume of 3) is set smaller than the song playing volume of the phantom rectangular character 33e at the musical interval position of Re (a volume of 4). In this case, as the musical interval of the song playing volume of the phantom rectangular character 33e is smaller, the song playing volume of the phantom rectangular character 33e is smaller.

The song that is composed of the thus-configured phantom rectangular characters 33e is set to have a smaller song playing volume than the song that is composed of the rectangular characters 33a, and thus corresponds to echo sound in the stadium in the baseball video game. In this embodiment, if the rectangular characters 33a are only arranged by the player, the phantom rectangular characters 33e are automatically created. Therefore, the player can easily create a fight song with reality close to actual baseball games without complicated operation. Note that the phantom rectangular characters 33e, and the musical intervals and the song playing volumes that are shown inside the phantom rectangular characters 33e are not displayed on the fight song creation screen 30 in actual use, and are hypothetically shown for the sake of explanation.

Figure 13:
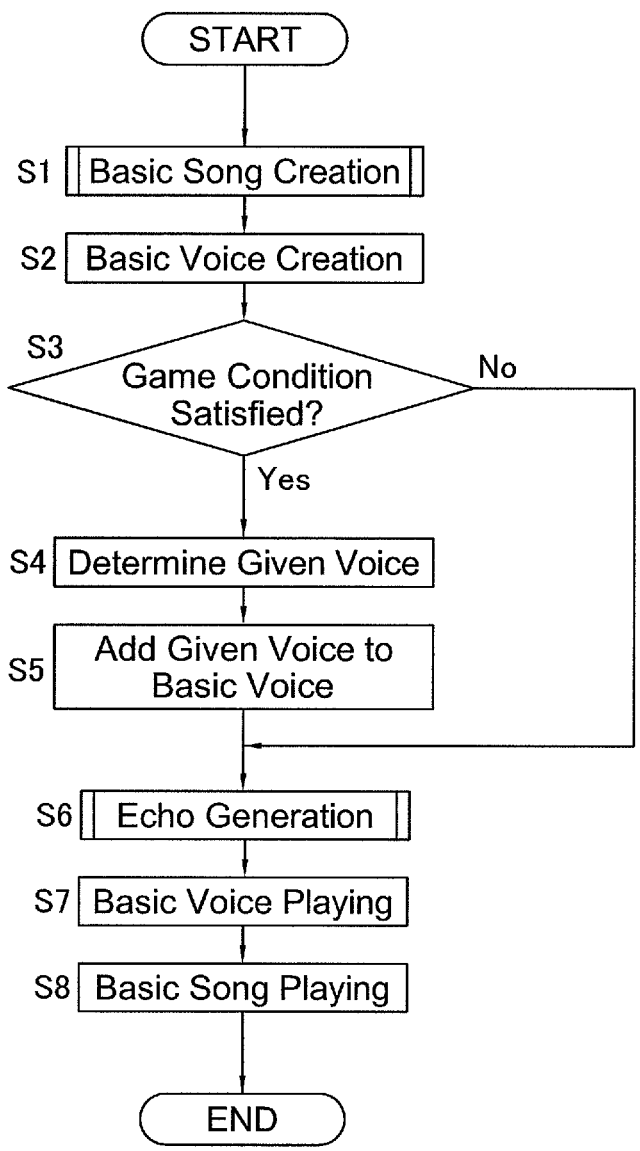
FIG. 13 is a flowchart of fight song creation processing in the aforementioned baseball video game.
Figure 14:
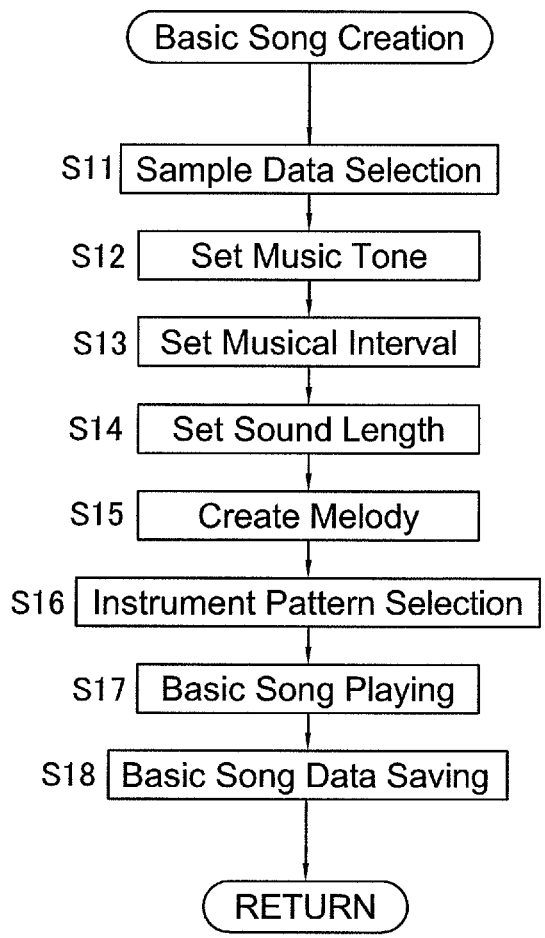
FIG. 14 is a flowchart of basic song creation processing in the aforementioned fight song creation process.
Figure 15:
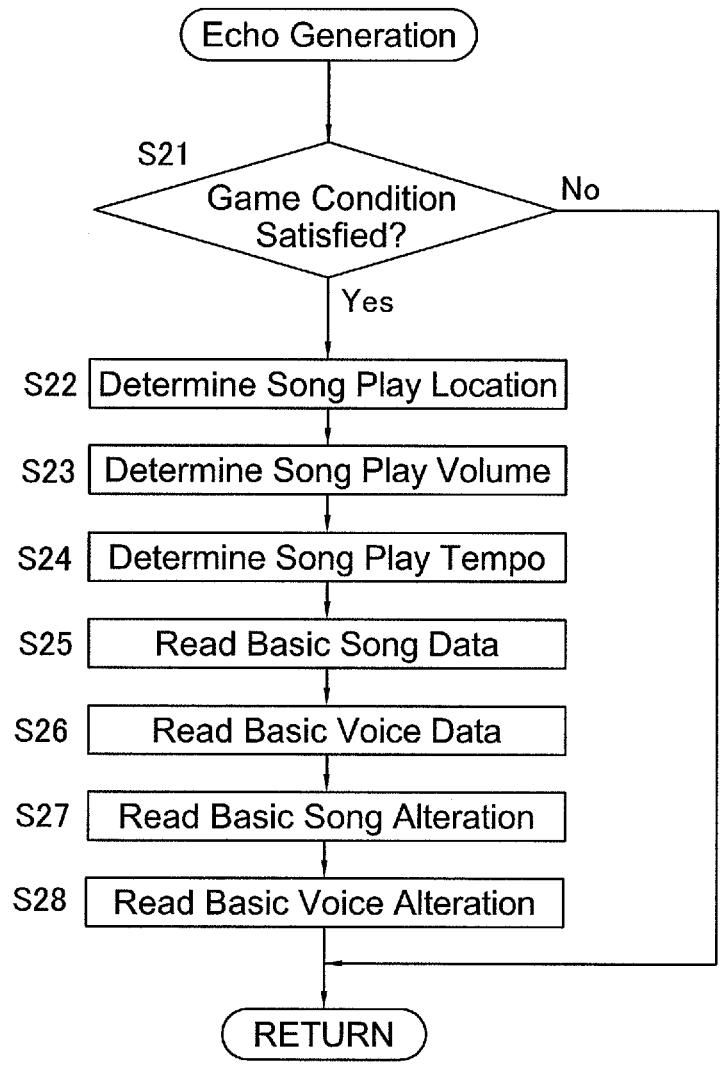
FIG. 15 is a flowchart of echo creation processing in the aforementioned fight song creation process.

Various Types of Processing Flows in Fight Song Creation Processing Execution in Baseball Video Game The following description describes the fight song creation processing in the baseball video game according to this embodiment with reference to flowcharts shown in FIGS. 13 to 15.

First, in the sound setting/fight song creation selection screen 25 shown in FIG. 3, the selection cursor 28 is positioned on the periphery of the fight song creation screen selection item 27 by press operation of the left key 17L or the right key 17R. If the second button 17b or the third button 17c is pressed in this state, the sound setting fight song creation selection screen 25 is switched into the fight song creation screen 30 shown in FIG. 8 is displayed, and thus fight song creation processing shown in FIG. 13 starts.

In the fight song creation screen 30 shown in FIG. 8, basic song creation processing shown in FIG. 13 is executed which creates the given basic song as a trumpet and dram fight song that has a melody and a rhythm of a common theme song for a scoring opportunity for the team to which the batter character 72 belongs (S1).

In the basic song creation processing of Step S1, as shown in FIG. 14, sample data selection processing is executed which selects the song that includes the melody that is previously stored in the storage portion 2 in the sample data selection screen 37 shown in FIG. 4 (S11). After the given sample data component is selected, when selection operation is performed in the state where the selection cursor 36i is positioned at the music tone setting item 36d in FIG. 8, the music tone setting screen 40 shown in FIG. 5 will be displayed, and the music tone setting is executed which sets the key and the tempo of the basic song (S12).

Subsequently, in the basic song creation processing shown in FIG. 14, in the fight song creation screen 30 shown in FIG. 8, a plurality of the musical note characters 33 are arranged to provide certain musical intervals and sound lengths of the musical note characters 33 in the musical note input field 32, and thus musical interval setting (S13), sound length setting (S14), and melody creation (S15) are executed which create the basic song that has a melody. In the musical interval setting of Step S13, operation of the up key 17U or the down key 17D adjusts the height position of the musical note character 33 so that the musical interval of the musical note character 33 is specified (see FIG. 10). In the sound length setting of Step S14, operation of the left key 17L or the right key 17R moves the horizontal length of the musical note character 33 upward and downward so that the sound length of the musical note character 33 is specified (see FIG. 9). In the melody creation of Step S15, a melody is created by the combination of a plurality of the musical note characters 33 that are arranged in the musical interval setting of Step S13, and the sound length setting of Step S14.

Figure 6:
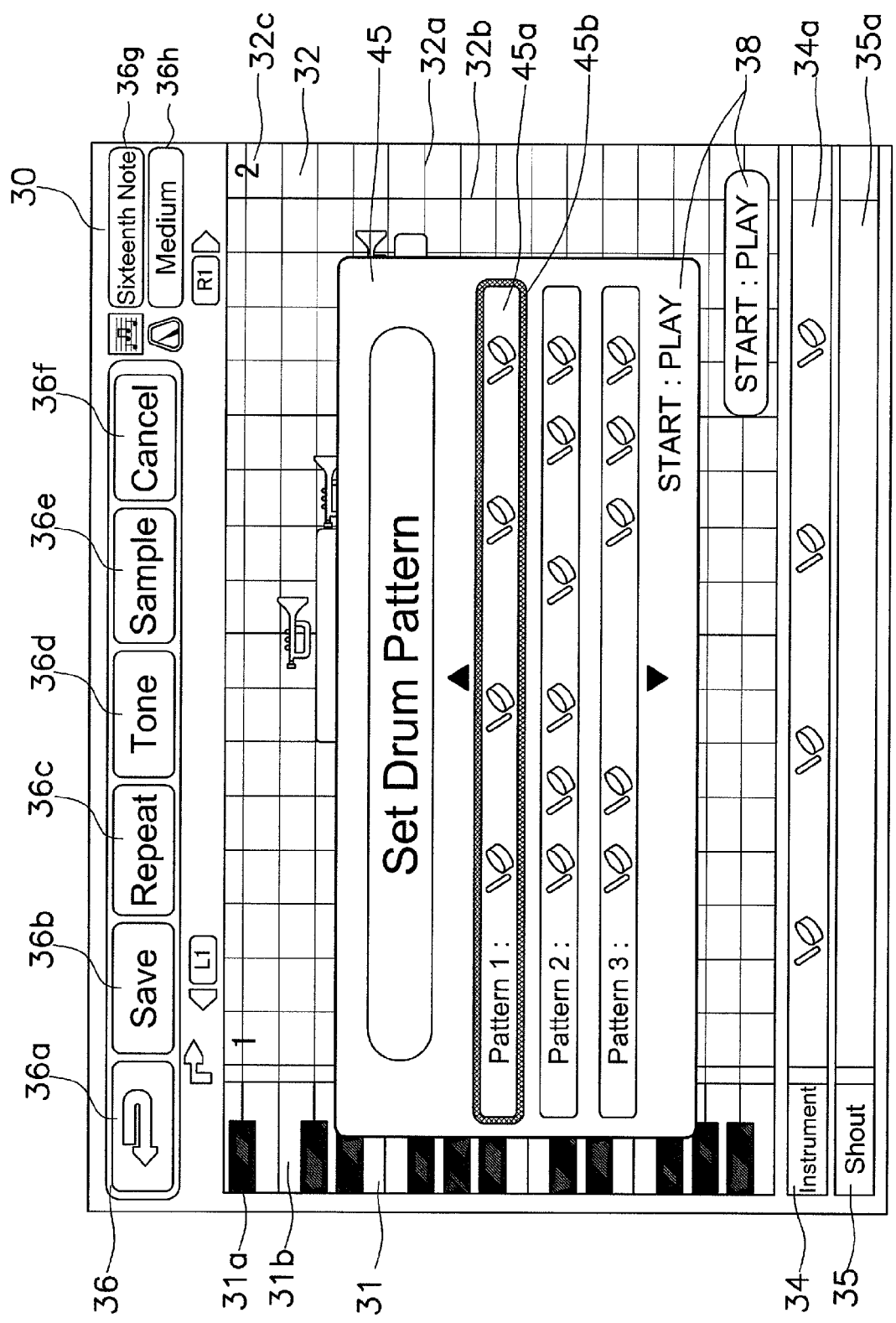
FIG. 6 is a view showing a musical instrument pattern select screen in the aforementioned fight song creation screen.

Also, in FIG. 8, when selection operation is performed in the state where the selection cursor 33d of the musical note character 33 is positioned at the musical instrument pattern selection item 34 in the musical instrument pattern display field 34a, a musical instrument pattern selection screen 45 shown in FIG. 6 will be displayed, and musical instrument pattern selection processing will be executed which selects the drum beat pattern that does not have a melody (S16).

Subsequently, in the basic song creation processing shown in FIG. 14, if the start button 17e is pressed in the fight song creation screen 30 shown in FIG. 8, the completed basic song will be played (S17). If the player performs selection operation in the state where the selection cursor 36i is positioned at the selection item 36b among the various types of mode setting selection items 36 that is used to save a song, the completed song can be saved in the storage portion 2 as data associated with the batter character 72 (S18), and the sequence returns to the fight song creation processing shown in FIG. 13.

After the basic song is created in Step S1 shown in FIG. 13, in FIG. 8, when selection operation is performed in the state where the selection cursor 33d of the musical note character 33 is positioned at the encouraging shout pattern display field 35a of the encouraging shout pattern selection item 35, the encouraging shout pattern selection screen 46 shown in FIG. 7 will be displayed, and the basic voice creation processing will be executed which selects the given common encouraging shout for the team to which the batter character 72 belongs such as "KATTOBASE", "MOERO! MOERO!", "LET'S GO! LET'S GO!", and "GO GO! LET'S GO!" for creation (S2).

After the basic voice is created in Step S2 shown in FIG. 13, it is determined whether the given game condition is satisfied (S3). The given game condition is defined by the game condition determination table 90 shown in FIG. 16.

The game condition determination table 90 includes game condition items 91, game condition data elements 92 as data to be included in the game condition items 91, selected game condition elements 93 that are selected from the game condition data elements 92, as shown in FIG. 16. The game condition items 91 are provided by various types of condition items such as team names, athlete names, stadium names, stadium types, stadium arrangements, home/away, batting/fielding, scoring opportunity/non-scoring opportunity, and scoring opportunity conditions. The athlete names, the stadium name, home/away are determined by the team name. The stadium type and the stadium arrangement are determined by the stadium name. For example, in the case where the team name of the player is Team A, Stadium A is determined as a home stadium. After the determination is made as Stadium A, the stadium type is determined as a dome stadium, and the stadium arrangement is determined that the right stand is the home team side. In addition to this, in the case where the name of an athlete who belongs to Team A as a point getter is Athlete B, an item of point getter is selected as the scoring opportunity condition.

In Step S3 shown in FIG. 13, it is determined based on the game condition determination table 90 shown in FIG. 16 whether the game condition in that the team of the player is batting is satisfied (S3). If the team of the player is batting, the sequence goes to Step S4. If the team of the player is fielding, the sequence goes to Step S6.

In Step S4 shown in FIG. 13, in the case of the game condition in that the name of an athlete who belongs to Team A is Athlete B in the game condition determination table 90 shown in FIG. 16, "the name (or nickname) of the batter character 72" as the given voice is determined as "the name (or nickname) of Athlete B" (S4). Subsequently, the sequence goes to Step S5, "the name (or nickname) of Athlete B" as the given voice that is determined in Step S4 is added to follow the given basic voice that is created in Step S2 as common encouraging shout for the team to which the batter character 72 belongs, such as "KATTOBASE", "MOERO! MOERO!", "LET'S GO! LET'S GO!", "GO GO! LET'S GO!" (S5). When the given voice is added to the basic voice in Step S5, the sequence goes to Step S6.

In Step S6 shown in FIG. 13, if it is determined that the given game condition is satisfied based on the game condition determination table 90 shown in FIG. 16, echo generation processing is executed which produces game sound so that the given song related to the batter character 72 is played at the song playing location, the song playing volume and song playing tempo that are determined based on the given game condition determination table 95 shown in FIG. 17 as if the song is played on the right stand side, for example (S6).

In the echo creation processing of Step S6, as shown in FIG. 15, it is determined whether the given game condition is satisfied (S21). The given game condition is defined by the game condition determination table 90 shown in FIG. 16, and the given game condition determination table 95 shown in FIG. 17.

The given game condition determination table 95 includes game condition items 96, game condition data elements 97 as data to be included in the game condition items 96, selected game condition elements 98 that are selected from the game condition data elements 97, as shown in FIG. 17. The game condition items 96 are various types of condition items. One of "Right-Field Side", "Left-Field Side", and "Whole" is selected as the song playing location. The "Whole" refers to both the right side and the left side. One of "High", "Medium", and "Low" is selected as the song playing volume. One of "Fast", "Medium", and "Slow" is selected as the song playing tempo. In this case, in the case where the name of the team of the player is Team A, the stadium is determined as the home stadium for Team A of Stadium A based on the game condition determination table 90 shown in FIG. 16. When the stadium is determined as Stadium A, the stadium type is determined as a dome stadium, and the stadium arrangement is determined that the right stand is the home team side. Accordingly, the song playing location is determined as "Right-Field Side", and the song playing volume is determined as "High" based on the given game condition determination table 95 shown in FIG. 17. Also, in the case of runners in scoring position if the batter name is the name of a point getter in the scoring opportunity condition in the game condition determination table 90, the song playing volume is determined as "High", and the song playing tempo is determined as "Fast" in the given game condition determination table 95 shown in FIG. 17.

In Step S21 shown in FIG. 15, it is determined based on the game condition determination table 90 shown in FIG. 16 whether the game condition in that the team of the player is batting and has a scoring opportunity is satisfied (S21). If the team of the player has a scoring opportunity, the sequence goes to Step S22. If the team of the player is not in a scoring opportunity, the sequence returns to the fight song creation processing shown in FIG. 13.

In Step S22 shown in FIG. 15, in the case where the stadium type is determined as a dome stadium, and the stadium arrangement is determined that the right stand is the home team side based on the game condition determination table 90 shown in FIG. 16, the song playing location is determined as the "Right-Field Side" based on the given game condition determination table 95 shown in FIG. 17 (S22). In Step S23 shown in FIG. 15, in the case where the stadium type is determined as a dome stadium, and if it is determined that runners are in scoring position and that the batter name is the name of a point getter in the scoring opportunity condition based on the game condition determination table 90 shown in FIG. 16, the song playing volume is determined as "High" based on the given game condition determination table 95 shown in FIG. 17 (S23). In Step S24 shown in FIG. 15, in the case where the stadium type is determined as a dome stadium, and if it is determined runners in scoring position and that the batter name is the name of a point getter in the scoring opportunity condition based on the game condition determination table 90 shown in FIG. 16, the song playing tempo is determined as "Fast" based on the given game condition determination table 95 shown in FIG. 17 (S24).

In Step S25 shown in FIG. 15, the basic song that is created is Step S1 is read (S25). In Step S26 shown in FIG. 15, the basic voice that is created in Step S2, or the basic voice to which the given voice is added in Step S5 is read (S26). Subsequently, in Step S27 shown in FIG. 15, basic song data alteration processing is executed which alters the data of the basic song to achieve the song playing location, the song playing volume, and the song playing tempo that are determined in Steps S22, S23 and S24 (S27). In Step S28 shown in FIG. 15, basic voice data alteration processing is executed which alters the data of the basic voice to achieve the song playing location, the song playing volume, and the song playing tempo that are determined in Steps S22, S23 and S24 (S28). The sequence returns to the fight song creation processing shown in FIG. 13. In this case, in the cooperative video game screen in the baseball video game shown in FIG. 12 in that the pitcher character 70 and the batter character 72 are shown, the song playing volume on the right stand 80 side is set higher than the song playing volume on the left stand 82 side.

Figure 18:
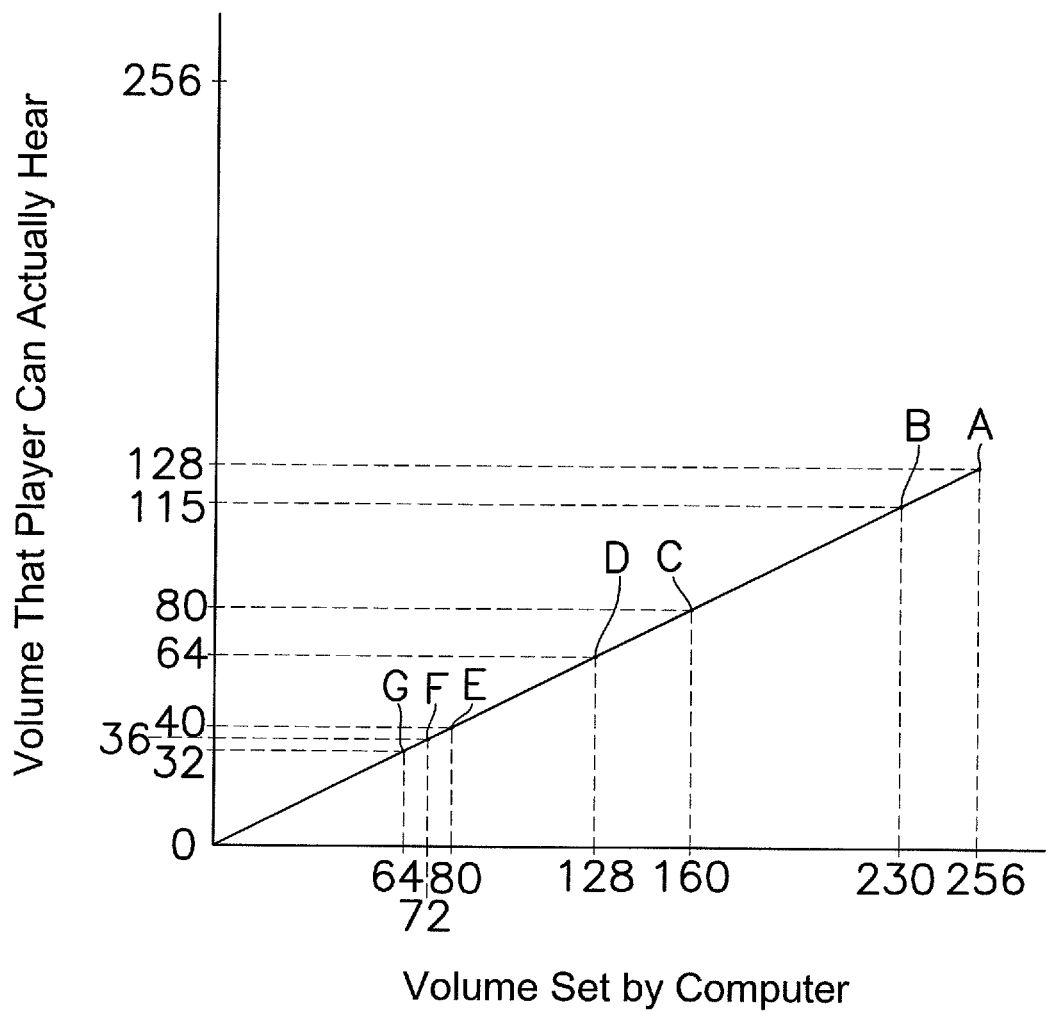
FIG. 18 is a graph showing a relationship between the volume that is set by a computer and the volume of sound that a player can actually hear

In addition to this, in the basic song data alteration processing of Step S27 shown in FIG. 15 and the basic voice data alteration processing of Step S28 shown n FIG. 15, processing is executed to alter not only the song playing volume on the right stand 80 as the determined location but also the song playing volume on the left stand 82 as the echo location. Specifically, the processing is described with reference to a graph shown in FIG. 18. FIG. 18 is the graph showing a relationship between the volume that is set by a computer and the volume of sound that the player can actually hear.

In FIG. 18, the horizontal axis indicates the volume that is set by the computer, and the vertical axis indicates the volume that the player actually hears. The volume that the player can actually hear is set approximately 50% of the volume that is set by the computer. The volume that is set by the computer has a parameter range of 256. The parameter can be set in the range from 0 to 255. Note that although the maximum value of the parameter is set to 256 for ease of calculation in FIG. 18, the parameter is substituted with a parameter that is offset in an actual computer.

As for the maximum volume A of the volume that is set by the computer, the volume that is set by the computer is a parameter value 256. The volume that the player can actually hear is a parameter value 126 as 50% of the parameter value 256. As for the maximum volume B of the volume in computer startup, the volume that is set by the computer is a parameter value 230. The volume that the player can actually hear is a parameter value 115 as 50% of the parameter value 230.

The song playing volume C on the right stand 80 side is set to approximately 70% of the maximum volume B of the volume in computer startup. The volume that is set by the computer is a parameter value 160 as 70% of the parameter value 230. The volume that the player actually can hear is a parameter value 80 as 50% of the parameter value 160. Also, the song playing volume D on the left stand 82 side is set to approximately 70% of the song playing volume C on the right stand 80 side. The volume that is set by the computer is a parameter value 128 as 70% of the parameter value 160. The volume that the player can actually hear is a parameter value 64 as 50% of the parameter value 128.

The echo song playing volume E on the right stand 80 side that is a song playing sound on the left stand side 82 that is played by reflection of a song playing sound that is played on the right stand 80 side is set to approximately 50% of the song playing volume C on the right stand 80 side. The volume that is set by the computer is a parameter value 80 as 50% of the parameter value 160. The volume that the player actually can hear is a parameter value 40 as 50% of the parameter value 80. Also, the echo song playing volume F on the left stand 82 side that is a song playing sound on the right stand side 80 that is played by reflection of a song playing sound that is played on the left stand 82 side is corrected to and set to a value higher than a reference volume G as 50% of the song playing volume D on the right stand 82 side. The volume that is set by the computer is a parameter value 72 as a value that is obtained by adding a parameter value 8 to the parameter value 64 as 50% of the parameter value 128. The volume that the player actually can hear is a parameter value 36 as 50% of the parameter value 72. In this embodiment, although the echo song playing volume F on left stand 82 side is small if not corrected, the echo song playing volume F on left stand 82 side can be altered to a proper volume that the player can actually hear by the correction that adds the parameter value 8 to the non-corrected echo song playing volume on left stand 82 side. Note that the correction volume is not limited to the parameter value 8. The correction volume can be set to any value, e.g., to a parameter value 30 unless the echo song playing volume F on the left stand 82 side becomes higher than the echo song playing volume E on the right stand 80 side.

In Step S7 shown in FIG. 13, the basic song that is created in Step S1, or the basic song that is created in Step S1 and is then altered by the echo generation processing in Step S6 is played (S7). In Step S7, the given basic song as a trumpet and dram fight song that has a melody and a rhythm of a common theme song for a scoring opportunity for the team to which the batter character 72 belongs is read from the storage portion 2. The given basic song as a trumpet and dram fight song is produced by the speaker 13 of the game sound producing portion 4.

It Step S8 shown in FIG. 13, the basic song is played in superposition of the basic song, and the basic voice that is created at Step S2, the basic voice to which the given voice is added in Step S5, the basic voice that is created in Step S2 and is then altered by the echo generation processing in Step S6, or the basic voice that is subjected to addition of the given voice in Step S5 and is then altered by the echo generation processing in Step S6 (S8). In Step S8, the given basic voice data of the encouraging shout such as "KATTOBASE, the name (or nickname) of the batter character 72", "MOERO! MOERO! the name (or nickname) of the batter character 72", "LET'S GO! LET'S GO! the name (or nickname) of the batter character 72", and "GO GO! LET'S GO! the name (or nickname) of the batter character 72" is read from the storage portion 2, and thus the given basic song as the trumpet and dram fight song is produced by the speaker 13 of the game sound producing portion 4.

In this case, the trumpet and dram basic song that has a melody and a rhythm of a common theme song for a scoring opportunity is played in superposition of the trumpet and dram basic song and the basic voice of the encouraging shout such as "KATTOBASE, the name (or nickname) of the batter character 72", "MOERO! MOERO! the name (or nickname) of the batter character 72", "LET'S GO! LET'S GO! the name (or nickname) of the batter character 72", and "GO GO! LET'S GO! the name (or nickname) of the batter character 72" Accordingly, it is not necessary to create the fight song of "KATTOBASE, the name (or nickname) of the batter character 72" for each batter character 72. Therefore, it is possible to reduce the data of game sound as a whole. As a result, the storage capacity of the memory is unlikely to be short. Also, it is possible to play fight songs "KATTOBASE, the name (or nickname) of the batter characters 72" for batter characters 72 differently from each other. Therefore, it is possible to provide a baseball video game with reality close to actual baseball games.

Other Embodiments

In the foregoing embodiment, although the home video game device is used as an exemplary computer to which a game program can be applied, the game device is not limited to the foregoing embodiment. The present invention can be applied to a game device that includes a separated monitor, a game device that includes a monitor attached thereto unitarily, a personal computer that can serve as a game device by executing a game program, a mobile game device, a mobile phone, PDA, a commercial gaming machine, and the like.

(b) The present invention includes a program that realizes the aforementioned game, and a computer-readable storage medium that stores the program. Examples of the storage medium can be provided by computer-readable flexible disk, semiconductor memory, CD-ROM, DVD, BD-ROM (Blu-ray Disk-ROM), UMD, ROM cassette, and other medium.

(c) Although, in the foregoing embodiment, the baseball video game is described as an exemplary video game that is executed in the game device, the game that is executed in the game device is not limited to this. The present invention can be applied to various types of games. For example, the present invention can be applied to various types of sport games such as soccer and combat sport, simulation games, shooting games, role playing games, and the like.

INDUSTRIAL APPLICABILITY

In the present invention, in a game program, since the game sound is produced by a song playing function as if a specific fight song related to a game character is played at a song playing location that is determined by a song playing location determining function, it is possible to provide a baseball video game with reality close to actual baseball games and to improve a sense of realism in the video game.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A non-transitory computer readable medium storing a game program for operating a baseball video game, in which first and second teams play at a stadium, the game program comprising:

code for determining whether or not a given game condition is satisfied, the given game condition being a situation in which the first team has an opportunity of winning;

code for determining a first song playing location for playing a song that is assigned to the character, if the given game condition is satisfied, the first song playing location being at a left-field stand of the stadium;

code for producing game sound from a sound producing device to render the song to be heard by a user as if the song is virtually played at the first song playing location in the game;

code for displaying a first sound note at the first sound playing location when the song is virtually played at the first song playing location in the game;

code for determining a second song playing location that is spaced away from the first song playing location for playing the song, if the given game condition is satisfied, the second song playing location being at a right-field stand of the stadium;

code for producing the game sound from the sound producing device to render the song to be heard by the user as if the song is virtually played at the second song playing location in the game;

code for displaying a second sound note at the sound playing location when the song is virtually played at the second playing location in the game; and code for producing the game sound to render the song virtually being played louder at the first song playing location than at the second song playing location, if the first song playing location is selected for the song to be played, the song being virtually played earlier at the first song playing location than at the second song playing location.

2. The non-transitory computer readable medium according to claim 1, further comprising
   code for composing the song.

3. The non-transitory computer readable medium according to claim 1, wherein
   the song virtually fades out at the end of the song at the first song playing location.

4. The non-transitory computer readable medium according to claim 1, wherein
   the song is virtually played earlier at the first song playing location than at the second song playing location.

5. The non-transitory computer readable medium according to claim 4, wherein
   the song virtually fades out at the end of the song at the first song playing location.

6. The non-transitory computer readable medium according to claim 1, wherein
   the video game is a baseball game between the first and second teams,
   in the situation, the first team has the opportunity with a runner on base for scoring and a slugger at bat, and
   the first song playing location is a first part of a stadium in the game at which funs of the first team cheer the first team when the first team has the opportunity,
   the second location song playing location is a second part of the stadium at which funs of the second team cheer the second team when the second team has the opportunity,
   the first part is different from the second part.

7. A game device, comprising:
   a controller by which user inputs commands;
   a non-transitory computer readable medium storing a game program for operating a baseball video game, in which first and second teams play at a stadium, the game program including
      code for determining whether or not a given game condition is satisfied, the given game condition being a situation in which the first team is having an opportunity of winning,
      code for determining a first song playing location for playing a song that is assigned to the character, if the given game condition is satisfied, the first song playing location being at a left-field stand of the stadium,
      code for producing game sound form a sound producing device to render the song to be heard by a user as if the song is virtually played at the first song playing location in the game,
      code for displaying a first sound note at the first sound playing location when the song is virtually played at the first song playing location in the game,
      code for determining a second song playing location that is spaced away from the first song playing location for playing the song, if the given game condition is satisfied, the second song playing location being at a right-field stand of the stadium,
      code for producing the game sound from the sound producing device to render the song to be heard by the as if the song is virtually played at the second song playing location,
      code for displaying a second sound note at the second sound playing location when the song is virtually played at the second playing location in the game, and
      code for producing the game sound to render the song virtually being played louder at the first song playing location than at the second song playing location, if the first song playing location is selected for the song to be played; and
   a computer connected to the controller and the computer medium, and arranged to execute the computer program,
   the song being virtually played earlier at the first song playing location than at the second song playing location.

8. The game device according to claim 7, wherein the game program includes a code for composing the song.

9. The game device according to claim 7, wherein the song virtually fades out at the end of the song at the first song playing location.

10. The game device according to claim 7, wherein the song is virtually played earlier at the first song playing location than at the second song playing location.

* * * * *